US012769405B1

(12) United States Patent
Alameh et al.

(10) Patent No.: US 12,769,405 B1
(45) Date of Patent: Oct. 20, 2026

(54) SYSTEM AND METHOD FOR CAPACITIVE SPLIT CONTACTLESS KEYBOARD STACK WITH CAPACITIVE ENCODING TO IDENTIFY AMONG A PLURALITY OF REMOVABLE TACTILE INPUT LAYERS

(71) Applicant: Dell Products LP, Round Rock, TX (US)

(72) Inventors: Rachid M. Alameh, Crystal Lake, IL (US); Jason Scott Morrison, Chadron, NE (US); Brandon Joel Brocklesby, Pflugerville, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/275,466

(22) Filed: Jul. 21, 2025

(51) Int. Cl.
*G06F 3/02* (2006.01)
*G06F 3/023* (2006.01)

(52) U.S. Cl.
CPC .......... *G06F 3/0238* (2013.01); *G06F 3/0202* (2013.01); *G06F 2203/04107* (2013.01); *G06F 2203/04108* (2013.01)

(58) Field of Classification Search
CPC ............ G06F 3/02–027; G06F 3/0393; H01H 13/70–88; H03K 17/9622
See application file for complete search history.

(56) References Cited

U.S. PATENT DOCUMENTS 7,847,204 B2 12/2010 Tsai
9,465,412 B2 * 10/2016 Belesiu ................ G06F 3/0414
9,543,948 B2 * 1/2017 Curtis .................... H01H 25/04
9,632,591 B1 * 4/2017 Marshall ............... G06F 3/0443
10,175,782 B2 * 1/2019 Katsuhara ........... G06F 3/04883
10,241,590 B2 * 3/2019 Marshall ................ H03K 17/98
10,671,180 B2 * 6/2020 Nishimura ............ G06F 3/0233
10,706,231 B2 * 7/2020 Kamata ................... G06F 3/023
11,139,129 B2 10/2021 Wang et al.
11,406,051 B2 * 8/2022 Huang .................... G06F 3/023
11,817,275 B2 11/2023 Wang et al.
(Continued)

FOREIGN PATENT DOCUMENTS

WO 2016/111876 A1 7/2016

*Primary Examiner* — Gene W Lee
(74) *Attorney, Agent, or Firm* — Prol Intellectual Property Law, PLLC; H. Kenneth Prol

(57) ABSTRACT

An information handling system having a split keyboard structure with a keyboard sensing hardware structure formed under a sealed input surface with a hardware processor, a data storage device, and a power management unit formed into a keyboard chassis. The keyboard sensing hardware structure includes capacitive pad sensors operably coupled to a capacitive sensor microprocessor to detect capacitive changes from user interaction with one of a plurality of removable tactile input layers installed above the sealed input surface. The capacitive sensor microprocessor executes machine readable code instructions of a dynamic key mapping engine to detect, via the capacitive pad sensors, capacitive encoding for determining a first removable tactile input layer that is installed from among the plurality of removable tactile input layers via detection of cumulative capacitance or a first set of conductive material portions formed with a plurality of keyboard keys having a unique layout, number, or arrangement.

20 Claims, 10 Drawing Sheets

(56) References Cited

U.S. PATENT DOCUMENTS

| | | | | |
|---|---|---|---|---|
| 2007/0199804 | A1 | 8/2007 | Joseph et al. | |
| 2009/0073128 | A1 | 3/2009 | Marsden | |
| 2011/0095919 | A1* | 4/2011 | Ostermoller | G06F 3/0202 341/33 |
| 2011/0102326 | A1 | 5/2011 | Casparian et al. | |
| 2011/0290628 | A1 | 12/2011 | Tsai | |
| 2011/0297523 | A1 | 12/2011 | Tsai | |
| 2012/0228111 | A1 | 9/2012 | Peterson et al. | |
| 2013/0135211 | A1* | 5/2013 | Chiang | G06F 3/0446 345/168 |
| 2013/0313094 | A1 | 11/2013 | Shen et al. | |
| 2013/0342464 | A1* | 12/2013 | Bathiche | G06F 3/0202 29/622 |
| 2013/0342465 | A1* | 12/2013 | Bathiche | H01H 9/08 200/5 A |
| 2014/0062684 | A1 | 3/2014 | Casparian et al. | |
| 2014/0069792 | A1 | 3/2014 | Bates et al. | |
| 2014/0097857 | A1 | 4/2014 | Hu | |
| 2014/0224633 | A1 | 8/2014 | Peterson et al. | |
| 2015/0036274 | A1* | 2/2015 | Belesiu | G06F 3/0414 361/679.11 |
| 2015/0280708 | A1* | 10/2015 | Goto | H03K 17/98 341/33 |
| 2016/0195955 | A1 | 7/2016 | Picciotto et al. | |
| 2018/0032501 | A1* | 2/2018 | Kamata | G06F 3/023 |
| 2018/0217668 | A1 | 8/2018 | Ligtenberg et al. | |
| 2018/0217669 | A1 | 8/2018 | Ligtenberg et al. | |
| 2018/0218859 | A1 | 8/2018 | Ligtenberg et al. | |
| 2020/0278747 | A1 | 9/2020 | Ligtenberg et al. | |
| 2020/0296866 | A1* | 9/2020 | Huang | G06F 3/0202 |
| 2021/0165513 | A1 | 6/2021 | Liu et al. | |
| 2021/0407748 | A1 | 12/2021 | Wang et al. | |
| 2022/0326777 | A1 | 10/2022 | Ligtenberg et al. | |
| 2023/0333658 | A1 | 10/2023 | Ligtenberg et al. | |
| 2024/0047156 | A1 | 2/2024 | Wang et al. | |
| 2025/0044874 | A1 | 2/2025 | Ligtenberg et al. | |

* cited by examiner

SYSTEM AND METHOD FOR CAPACITIVE SPLIT CONTACTLESS KEYBOARD STACK WITH CAPACITIVE ENCODING TO IDENTIFY AMONG A PLURALITY OF REMOVABLE TACTILE INPUT LAYERS

FIELD OF THE DISCLOSURE

The present disclosure generally relates to a system and method for capacitive split contactless keyboard stack for used with a plurality of removable tactile input layers of an information handling system. The present disclosure more specifically relates systems and methods for capacitive encoding of a plurality of removable tactile input layers, such as various keyboards with a capacitive split contactless keyboard stack for identifying which of the plurality of removable tactile input layers is operatively coupled to a sealed input surface forming part of the capacitive split contactless keyboard stack.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as for teleconferencing, word processing, sales systems, business software, gaming applications, or the like. In some embodiments, a user interface via a keyboard or other input/output (I/O) may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
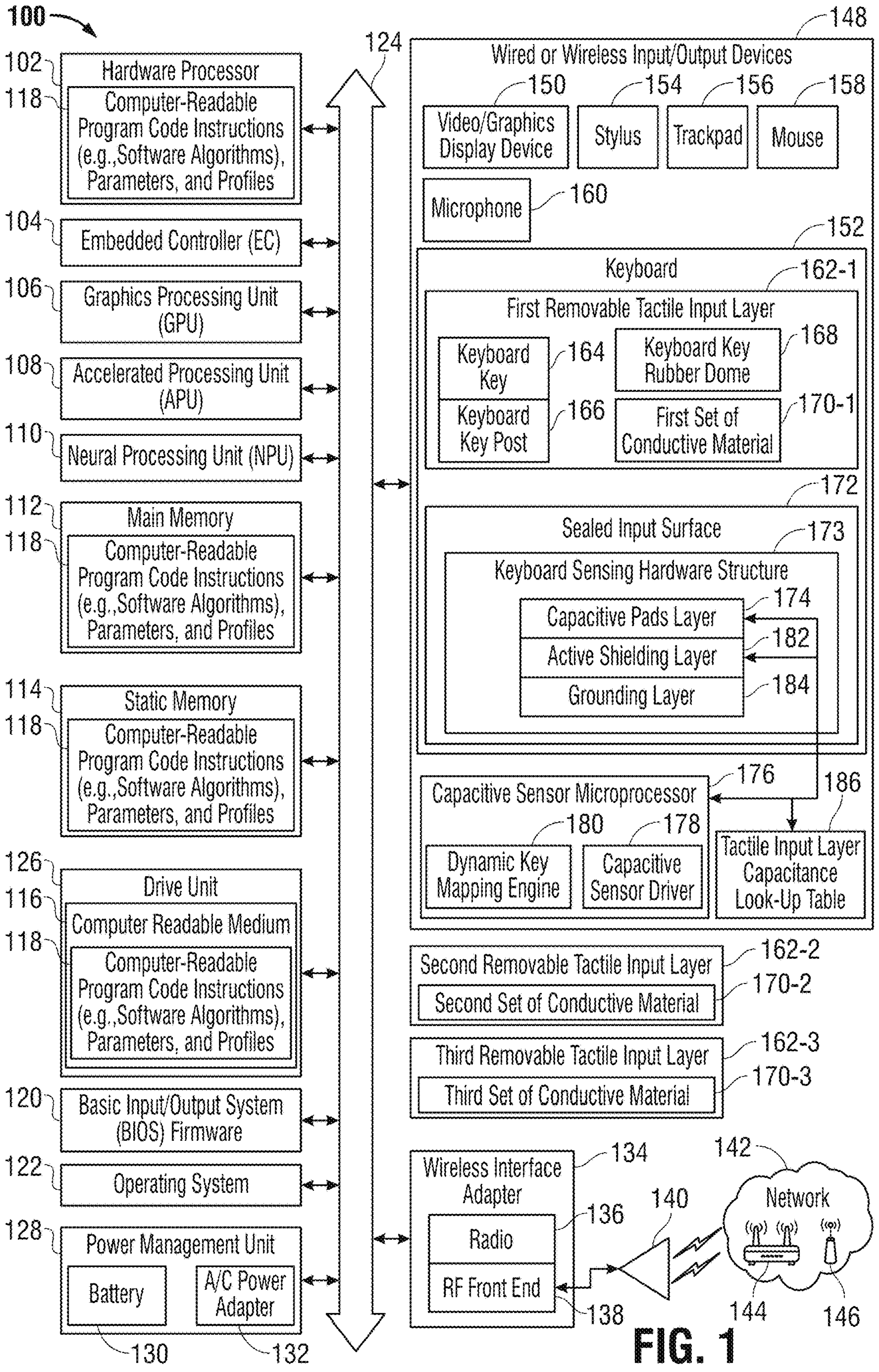
FIG. 1 is a block diagram illustrating an information handling system that includes a split keyboard stack structure having a removable tactile input layer and a separate sealed input surface to receive touch and gesture input from a user contactlessly at capacitive pad sensors in a keyboard sensing hardware structure formed under the sealed input surface according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include one or more input/output (I/O) devices for receiving user input and which may include a keyboard, a touchpad, a gesture sensing device such as a camera or infrared camera among other I/O devices. Laptop-type information handling systems include a built-in keyboard. These built-in keyboards are integrated into a base portion of the laptop-type information handling system. During operation, the user may accidentally spill liquids onto a keyboard which may damage the internal electrical connections or other electrical components within the keyboard. As liquids may damage the electrical components of the keyboard, the introduction of liquid onto the keyboard would require subsequent repair of the keyboard. Such a repair would require opening of the housing of the base portion of the information handling system to replace the damaged keyboard. Additionally, the introduction of liquid onto the keyboard portion of the base housing may also create damages to those other components within the base portion of the laptop-type information handling system. This is because current keyboards are not sufficiently designed to include a liquid barrier to the underlying keyboard components or these other computer hardware components within the base housing of the laptop-type information handling system.

It is also true that current keyboards include mechanical elements and electrical elements associated with each of the keys. These mechanical and electrical elements may include dome switches, scissor mechanisms, flexible printed circuit board traces, contact pads, contact switches, diaphragms, and the like. Those mechanical and electrical features may degrade over time with repeated physical contact. This may result in individual keys or a series of keys being inoperable. Costs associated with replacing these mechanical elements and the electrical elements associated with those mechanical elements may be expensive as well or may simply cause an entire keyboard to need to be replaced. The mechanical and electrical failure of these mechanical and electrical elements may, again, result in the need to replace the whole keyboard or the entire laptop information handling system increasing costs to consumers of such laptop-type information handling systems as well as generating waste and cost.

The present specification describes an information handling system that comprises a hardware processor, a data storage device, and a power management unit (PMU) to provide power to the hardware processor and data storage device. In embodiments herein, the information handling system may include a keyboard sensing hardware structure formed under the sealed input surface, as part of the split keyboard structure, that is operatively coupled to a capacitive sensor microprocessor as well as the hardware processor of the information handling system to receive one or more types of I/O input from the user. The keyboard sensing hardware structure may include a plurality of capacitive pad sensors in the capacitive pads layer formed under a sealed input surface of the keyboard sensing hardware structure. The capacitive pad sensors of the capacitive pads layer are operably coupled to a capacitive sensor microprocessor to detect capacitive changes from user interaction with one of a plurality of removable tactile input layers above the sealed input surface in embodiments herein. The split keyboard structure may also include one of a plurality of removable tactile input layers that may each receive mechanical tactile input from a user, such as keypress of mechanical-only portion of keyboard keys and which also may be used for touch inputs on the keyboard keys or gesture inputs above the keyboard keys that may be detected by capacitive sensing pads of the keyboard sensing hardware structure formed under the sealed input surface in embodiments. These plural removable tactile input layers may be installed over the sealed input surface via interference fit, magnetic interface structures, mechanical latch or other structure such that the removable tactile input layer is detachable and replaceable with a new or different removable tactile input layer, such as a new mechanical-only portion of the split-keyboard structure.

In order to detect which of the plurality of removable tactile input layers is coupled to the sealed input surface, each of the plurality of removable tactile input layers may include a capacitive encoding system to identify the removable tactile input layer, such as which type of keyboard layout or language, that is installed on the sealed input surface of a keyboard chassis for the information handling system in embodiments herein. The capacitive encoding system in embodiments includes a conductive material used with keycaps or a support frame structure of the removable tactile input layers that interacts with one or more of the capacitive pad sensors placed under the sealed input surface, such that no electronic components are exposed over the sealed input surface, in order to detect a specific cumulative capacitance of the conductive material to identify the removable tactile input layer, such as which keyboard removable tactile input layer, that has been installed. In an alternative embodiment, the entirety of the keyboard keys or other structures of the removable tactile input layers have differing overall capacitances, such as due to differing layouts of the keyboard keys, such that each of the plurality of removable tactile input layers may have signature cumulative capacitance of each removable tactile input layer installed and detectable by the one or more of the capacitive pad sensors formed under the sealed input surface of the keyboard chassis.

In embodiments herein, the capacitive sensor microprocessor executes machine readable code instructions of a dynamic key mapping engine to determine from the capacitive pad sensors associated with the keyboard keys the unique capacitive encoding due to the conductive material included in particular keyboard keys. In this way, the execution of the dynamic key mapping engine may detect the location and arrangement of that conductive material across the installed removable tactile input layer to identify which removable tactile input layer, such as which keyboard type, has been installed in an embodiment. In another example, the capacitive sensor microprocessor executes machine readable code instructions of a dynamic key mapping engine to temporarily increase the sensitivity of the capacitive pad sensors, such as with increased voltage to the capacitive pad sensors, to detect overall capacitance levels from across the array of capacitive sensor pads that serve as a unique capacitive encoding from the installed removable tactile input layer. In this way, the execution of the dynamic key mapping engine may detect cumulative capacitive levels as the capacitive encoding of the installed removable tactile input layer to identify which removable tactile input layer, such as which keyboard type, has been installed in another embodiment. In either example, a tactile input layer capacitance look-up table may be accessed by execution of the dynamic key mapping engine by the capacitive sensor microprocessor in order to determine which of the plurality of removable tactile input layers is currently installed on the sealed input surface. This allows the capacitive sensor microprocessor to execute machine readable program code instructions of a dynamic key mapping engine to associate those keyboard keys of any installed removable tactile input layer to be associated with the correct input from various keyboard layouts, various language keyboards, or even from other I/O input type removable tactile input layers installed such as for a drawing pad or control board in various embodiments herein.

In an embodiment, the capacitive pad sensors may be formed of carbon-based conductive deposits on a flexible laminate, a flexible printed circuit board (PCB) with copper or other conductive material, a rigid PCB, or on the undersurface of the sealed input surface with all of the capacitive pad sensors formed below the sealed input surface. Additionally, these capacitive pad sensors formed as carbon-based conductive deposits may be delicate and subject to scratching or damage if exposed to mechanical actuation or moving parts, but which are protected from contact in the keyboard sensing hardware structure formed under the sealed input surface according to embodiments herein. It is appreciated, therefore, that the actuation of the keyboard keys may be sensed without contacting the carbon trances of the capacitive pad sensors (i.e., contactlessly).

In an embodiment, the keyboard sensing hardware structure formed under the sealed input surface may also include an active shielding layer which may be operatively coupled to a capacitive sensor microprocessor and PMU to be supplied a voltage level to shield the plurality of capacitive pad sensors from parasitic capacitance grounding by a grounding source placed underneath the active shielding layer. In an embodiment, which active shielding layer prevents parasitic capacitance grounding from such grounding sources such as a dedicated grounding layer, a mother board ground, dedicated grounding devices, among others. In an embodiment, the plurality of capacitive pad sensors may be made of a deposited carbon layer that can detect capacitive changes from actuation of a keyboard key at a first capacitive change level, a touch of a human finger on a keyboard key at a second capacitive change level, and the presence of a human finger via a third level change in detected capacitance at the deposited carbon layers. The deposited carbon layers are operatively coupled via a flexible PCB, a rigid PCB, or deposited carbon connector lines to a capacitive sensor microprocessor. In an embodiment, because these connector lines may be narrow compared to, for example, capacitive sensor pads, the connector lines may experience a relatively higher resistivity based on line length. In an embodiment, the connector lines may, therefore, be formed from silver in contact with copper pads so that the connector lines may be less resistive from the capacitive sensor pads. Alternatively, carbon connector lines are used with multiple deposits of carbon that may be formed in order to lower the level of resistance of the formed carbon lines in other embodiments. It is appreciated that other electrical couplings may be made from the capacitive pad sensors to the capacitive sensor microprocessor for detecting the one or more capacitive change levels associated with corresponding keyboard key or keys or their locations in one or more of a plurality of different removable tactile input layers, such as the removable tactile input layer keyboard structures, installed on the sealed input surface. The same keyboard sensing hardware structure formed under the sealed input surface may be used with one or more plural removable tactile input layers or keyboard structures installed on the sealed input surface according to embodiments herein.

In an embodiment, each of the plurality of capacitive pad sensors may be operatively coupled to the capacitive sensor microprocessor executing machine readable code instructions of a capacitive sensor driver that can determine when various capacitive thresholds are reached that may indicate a press of a key on the removable tactile input layer, touch of a user's fingers over any given key of the removable tactile input layer, and/or hovering or gestures above the surface of the removable tactile input layer. In an embodiment, each of the plurality of capacitive pad sensors may be operatively coupled to, for example, the capacitive sensor driver via electrical traces formed on a surface such as a printed circuit board (PCB), a flexible PCB, or via one or more electrical traces deposited under and within the sealed input surface. These electrical sensor traces may be made of deposited carbon, indium tin oxide, silver traces, copper traces, or other electrical traces.

In an embodiment, because the removable tactile input layer is separate and removable layer from the sealed input surface of the information handling system in the split keyboard structure, the removable tactile input layer may be secured to the surface of the sealed input surface via an interference fit system, a latching mechanism, reciprocal magnetic structures, or an adhesive layer. This allows the removable tactile input layer to be selectively removed and for a user to easily replace that removable tactile input layer with a new or different removable tactile input layer enabling, for example, different user experiences where a removable tactile input layer may include a gaming keyboard. Thus, a user may have a plurality of removable tactile input layers that the user may swap out as needed in order to provide different input to the information handling system. Because any of the plurality of removable tactile input layers may be swapped out for a different removable tactile input layer without replacing the keyboard sensing hardware structure formed under the sealed input surface, the replacement removable tactile input layer, such as a replacement removable tactile input layer keyboard structure, may include a different key layout.

In embodiments herein, the information handling system may also include the capacitive sensor microcontroller executing machine readable code instructions of the dynamic key mapping engine configured to dynamically assign keyboard functions to specific capacitive pad sensor locations in the keyboard sensing hardware structure formed under the sealed input surface based on the determined user-defined layouts for each different type of removable tactile input layer. This may be done after the capacitive sensor microcontroller has determined the currently-installed removable tactile input layer. This assignment of keyboard functions results in the removable tactile input layer being user-replaceable and modular which allows for easy, cost-effective, repairs of removable tactile input layers, replacements of removable tactile input layers, and reconfigurations of input at the information handling system without having to open up a housing of the base portion of the laptop-type information handling systems according to embodiments of the present disclosure.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Machine readable code instructions stored in static memory 114, main memory 112, or drive unit 126 in a non-transitory machine readable medium may be involved in invoking such machine readable code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a split-keyboard structure 152, a video/graphics display device 150, a microphone 160, or any combination thereof. Further, various wired or wireless input and output (I/O) devices 148, such as a microphone 160, speaker, a trackpad 156, a stylus 154, a split-keyboard structure 152, a video/graphics display device 150, mouse 158, or any combination thereof may be integrated into the chassis of the information handling system 100 in other embodiments. A split-keyboard structure 152 may be formed with keyboard keys in a removable tactile input layer 162 having one or more keyboard layouts or I/O structure layouts such as a touch surface according to various embodiments of the present disclosure. Portions of an information handling system 100 may themselves be considered information handling systems 100.

Information handling system 100 may include devices or modules that embody one or more of the devices or execute instructions for one or more systems and modules. The information handling system 100 may execute machine readable code instructions (e.g., software algorithms) parameters, and profiles 118 that may operate on servers or systems, remote data centers, or on-box in individual client information handling systems according to various embodiments herein. In some embodiments, it is understood any or all portions of machine readable code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with non-transitory machine or computer readable medium 116 storing machine readable code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a split-keyboard structure 152 of embodiments herein, a mouse 158, video/graphics display device 150, stylus 154, trackpad 156, microphone 160, or speaker among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a split-keyboard structure 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes machine readable code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing machine readable code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a non-transitory machine or computer readable medium that includes machine readable code instructions, parameters, and profiles 118 or that receives and executes machine readable code instructions, parameters, and profiles 118 responsive to a propagated signal, so that a hardware device connected to a network 142 may communicate voice, video, or data over the network 142. Further, the machine readable code instructions, parameters, and profiles 118 may be transmitted or received over the network 142 via the network interface device or wireless interface adapter 134.

The information handling system 100 may include a set of machine readable code instructions, parameters, and profiles 118 that may be executed to cause the computer system to perform any one or more of the methods or computer-based functions disclosed herein. For example, machine readable code instructions, parameters, and profiles 118 may be executed by a hardware processor 102, GPU 106, EC 104, APU 108, NPU 110, or any other hardware processing resource and may execute software applications, agents, firmware, or other aspects or components used to execute the methods and systems described herein. Various software modules comprising application machine readable code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain machine or computer readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless I/O devices 148 such as the mouse 158, the stylus 154, the split-keyboard structure 152, microphone 160, and the trackpad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports. In an embodiment, the battery 130 may be charged via the AC power adapter 132 and provide power to the components of the information handling system 100 when AC power from the AC power adapter 132 is removed.

In a particular non-limiting, exemplary embodiment, the non-transitory machine or computer readable medium can include a solid-state memory such as a memory card or other package that houses one or more non-volatile read-only memories. Further, the machine or computer-readable medium can be a random-access memory or other volatile re-writable memory. Additionally, the machine or computer-readable medium can include a magneto-optical or optical medium, such as a disk or tapes or other storage device to store information received via carrier wave signals such as a signal communicated over a transmission medium. Furthermore, a machine or computer readable medium 116 can store information received from distributed network resources such as from a cloud-based environment. A digital file attachment to an e-mail or other self-contained information archive or set of archives may be considered a distribution medium that is equivalent to access to a tangible storage medium. Accordingly, the disclosure is considered to include any one or more of a machine or computer readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a split-keyboard structure 152 used by a user to provide keypress, touch, or touchless gesture input to the information handling system 100 according to various embodiments herein. In the context of the present specification, the information handling system 100 may be a laptop-type information handling system 100 that includes a base portion and a lid portion also referred to as a base or keyboard chassis and a display chassis in embodiments herein. A housing of the lid portion, in an embodiment, may house the video/graphics display device 150 described herein. The base portion may be where the split-keyboard structure 152 is placed giving the user the ability to provide input to the information handling system 100.

The split-keyboard structure 152 may include a first removable tactile input layer 162-1 installed on a sealed input surface 172 and independent of a keyboard sensing hardware structure 173 formed under a sealed input surface 172 that serves as a top surface housing for a base chassis or keyboard chassis of information handling system 100. The first removable tactile input layer 162-1 may be that layer that a user interacts with to provide input that is contactlessly detected by the keyboard sensing hardware structure 173 formed under a sealed input surface 172 of the chassis for the information handling system 100. This first removable tactile input layer 162-1, along with a replaceable second removeable tactile input layer 162-2 and a third removeable tactile input layer 162-3, may include only mechanical elements such as mechanical keyboard keys that provide tactile response to the user when the mechanical keyboard keys are pressed or other I/O interface structures such as touch areas. The removable tactile input layers 162-1 162-2, 162-3 may not have any associated electronics and a user's finger or movement of mechanical keyboard keys may affect capacitance detected in the keyboard sensing hardware structure 173 formed under the sealed input surface 172 such as with a capacitive pads layer 174 in embodiments herein. In a specific example, the removable tactile input layers 162-1 162-2, 162-3 may be different keyboard layouts or types and include a keycap or keyboard key 164 operatively coupled to a keyboard key rubber dome 168 or popple via a keyboard key post 166 forming a mechanical keyboard key 164 among a plurality of mechanical keyboard keys 164. The plurality of mechanical keyboard keys 164 may be formed in a tray, grid or other support structure formed of a suitable material for the removable tactile input layers 162-1, 162-2, 162-3 in embodiments herein. In an example embodiment, instead of the keyboard key rubber dome 168 having a switch or activating a switch on a printed circuit board (PCB), the keyboard key 164, keyboard key post 166, and keyboard key rubber dome 168 may be used to help provide location of a keyboard key 164 in the removable tactile input layers 162-1 162-2, 162-3 and over the keyboard sensing hardware structure 173 formed under the sealed input surface 172 as well as provide tactile feedback to the user. No physical engagement with keypress sensing electronics is required in the removable tactile input layers 162-1 162-2, 162-3 and, accordingly, the removable tactile input layers 162-1 162-2, 162-3 are easily removable and replaceable for any of a plurality of other removable tactile input layers 162-1 162-2, 162-3 that can be replaced and used with the keyboard sensing hardware structure 173 formed under the sealed input surface 172. In this example embodiment, the keyboard keys 164 of any of the plurality of removable tactile input layers 162-1 162-2, 162-3 may also include scissor or butterfly arms that also provide tactile feedback to the user while facilitating the recoil of the keyboard key 164 upwards for tactile feedback of a keypress to a user. However, the removable tactile input layers 162-1 162-2, 162-3 do not include any electrical elements that are used to receive electrical signals as the user presses the keyboard keys 164. Therefore, in the embodiments herein, the removable tactile input layers 162-1 162-2, 162-3 do not include a PCB layer, a flexible PCB layer, or other electrical components that other keyboards may use to detect the press of a key by the user. Instead, in the embodiments herein, the split-keyboard structure of the keyboard 152 includes the keyboard sensing hardware structure 173 formed under the sealed input surface 172 where those keypress strokes of the keyboard keys 164 on the removable tactile input layers 162-1 162-2, 162-3 are capacitively detected, thus contactlessly sensed.

The keyboard sensing hardware structure 173 formed under the sealed input surface 172 may include a plurality of layers used to detect those keypress keystrokes during actuation of keyboard keys 164 on the removable tactile input layers 162-1 162-2, 162-3 of the split-keyboard structure of the keyboard 152 above the sealed input surface 172. In an embodiment, the sealed input surface 172 may be sealed such that liquids, dust, and other contaminants cannot enter into the base portion of the information handling system 100. This prevents those contaminants from damaging those hardware elements formed into the housing of the base portion of the information handling system 100.

In an example embodiment, the keyboard sensing hardware structure 173 formed under the sealed input surface 172 may include a capacitive pads layer 174. The capacitive pads layer 174 includes a plurality of capacitive pad sensors that may correspond to various keyboard keys 164 in the first removable tactile input layer 162-1 to detect capacitive changes due to actuation of those keyboard keys 164 of the first removable tactile input layer 162-1 above the sealed input surface 172 of the chassis of the information handling system 100. Further, the capacitive pads layer 174 includes a plurality of capacitive pad sensors to detect capacitive changes due to touch input by a user's fingers on any of the keyboard keys 164 or I/O structures on the removable tactile input layers 162-1 162-2, 162-3, in an embodiment. In yet another embodiment, the capacitive pads layer 174 may include the plurality of capacitive pad sensors that may detect capacitive changes due to sensing proximate location of the user's body part, including fingers or hand for a touchless gesture, above those keyboard keys 164 of the removable tactile input layers 162-1 162-2, 162-3 and above the sealed input surface 172 of the chassis of the information handling system 100.

In an embodiment, these capacitive pad sensors may be made of deposited carbon pads which may be delicate but are protected and sealed under the sealed input surface 172 of the chassis of the information handling system 100 for the keyboard sensing hardware structure 173. The deposited carbon capacitive sensing pads of the capacitive pads layer 174 have a benefit of very low cost and simple manufacturing via deposition or masked spraying to form these deposited carbon capacitive sensing pads. In an embodiment, these capacitive sensing pads of deposited carbon may be configured to vary an electric field in response to changes in nearby capacitance. These carbon-based patches may be arranged in a sensor matrix of capacitive sensing pads and may be printed, sputtered, or otherwise deposited on a non-conductive substrate such as an acrylonitrile butadiene styrene (ABS) polymer surface or any other surface such as the underside of the sealed input surface 172 or on a PCB or flexible PCB at very low cost. In an embodiment, the array of deposited carbon patches for the capacitive sensing pads in the capacitive pads layer 174 may be arranged such that each keyboard key 164 of the first removable tactile input layer 162-1 aligns vertically over the sealed input surface 172 with a deposited carbon patch capacitive sensing pads of the keyboard sensing hardware structure 173 formed under the sealed input surface 172 in embodiments herein.

In an embodiment, each of the plurality of capacitive pad sensors in the capacitive pads layer 174 may be operatively coupled to a capacitive sensor microprocessor 176 executing machine readable code instructions of a capacitive sensor driver 178. In an embodiment, each of the carbon capacitive sensing pads that form the plurality of capacitive sensors of the capacitive pads layer 174 may be operatively coupled to the capacitive sensor microprocessor 176 via carbon traces formed on a surface such as a PCB or a flexible PCB or on an ABS surface, or some combination in embodiments described herein. It is also appreciated that other types of traces may be formed to operatively couple the carbon pads to the capacitive sensor microprocessor 176 executing machine readable code instructions of the capacitive sensor driver 178 such as copper traces, silver traces, or indium tin oxide (ITO) that allow each of the carbon pads to conduct signals to the capacitive sensor driver 178 for determination of a particular keyboard key 164 keypress, determination of a user's touch input, or determination of a user's touchless gesture input at or near the keys or other input/output surfaces the first removable tactile input layer 162-1 for the split-keyboard structure 173. The capacitive sensor driver 178 may be executed by the capacitive sensor microprocessor 176 to detect and determine which of the plurality of keyboard keys 164 on the first removable tactile input layer 162-1 have been pressed and detected at each of the plurality of capacitive pad sensors based on location and a detected level of capacitance change. The capacitive sensor microprocessor 176 executing the machine readable code instructions of the capacitive sensor driver 178 may relay these inputs to the hardware processor 102 for processing of keystrokes as input to the information handling system 100 in embodiments herein.

In an embodiment, the capacitive sensor microprocessor 176 may execute machine readable code instructions of a dynamic key mapping engine 180. In an embodiment, the execution of the dynamic key mapping engine 180 may allow the capacitive sensor microprocessor 176 to determine which of the plurality of removable tactile input layers 162-1 162-2, 162-3 is operatively coupled to the sealed input surface 172 of the information handling system 100 based on detecting capacitive encoding. Again, because the first removable tactile input layer 162-1 may be swapped out for one of the second removeable tactile input layer 162-2 and third removeable tactile input layer 162-3 (or any other removeable tactile input layer described herein), the capacitive sensor microprocessor 176 and dynamic key mapping engine 180 may be used to detect which of the removable tactile input layers 162-1 162-2, 162-3 is installed. In order to determine which of the plurality of removable tactile input layers 162-1 162-2, 162-3 is operatively coupled to the sealed input surface 172, each of the removable tactile input layers 162-1 162-2, 162-3 may include a set of conductive material 170-1, 170-2, 170-3 that is detectable by one or more of the capacitive pad sensors of the capacitive pads layer 174. In an embodiment, a first set of conductive material 170-1 formed within the first removable tactile input layer 162-1 may be unique to the first removable tactile input layer 162-1 such that detection of a capacitance value from plural capacitive pad sensors that reflects a capacitive encoding from the inclusion of the first set of conductive material 170-1 within the first removable tactile input layer 162-1 at particular locations or generating particular capacitance levels. The capacitive encoding from the first set of conductive material 170-1 triggers detected capacitance levels that may be referenced in a tactile input layer capacitance look-up table 186 accessed by the capacitive sensor microprocessor 176 executing the machine readable code instructions of the dynamic key mapping engine 180. In other embodiments, each removable tactile input layer 162-1 162-2, 162-3 may have inherently distinct cumulative capacitance levels, even without respective first set of conductive material 170-1, second set of conductive material 170-2, and third set of conductive material 170-3. During startup of the information handling system 100, the capacitive sensor microprocessor 176 may determine a cumulative capacitance detected at all of the capacitive pad sensors or from particular capacitive pad sensors within the capacitive pads layer 174 from the inherent capacitance of or due to the first set of conductive material 170-1, second set of conductive material 170-2, and third set of conductive material 170-3 for each removable tactile input layer 162-1 162-2, 162-3. When reading this cumulative capacitance value, the detected capacitance may be unique as capacitive encoding to the first removable tactile input layer 162-1 and may be determined by the capacitive sensor microprocessor 176 executing the dynamic key mapping engine 180 and accessing a tactile input layer capacitance look-up table 186. This tactile input layer capacitance look-up table 186 may include anticipated cumulative capacitance levels, such as from particular capacitive pad sensors, that can be matched with a specific type of removable tactile input layer 162-1 162-2, 162-3. In this way, the capacitive sensor microprocessor 176 may first determine, at startup of the information handling system 100, which removable tactile input layer 162-1 162-2, 162-3 is installed.

In an alternative embodiment, at startup of the information handling system 100, the capacitive sensor microprocessor 176 may address each of the capacitive pad sensors of the capacitive pads layer 174 to determine where any of the conductive material pieces of a set of conductive material 170-1, 170-2, 170-3 are located throughout the first removable tactile input layer 162-1, for example, as capacitive encoding for each removable tactile input layer 162-1 162-2, 162-3. In this example embodiment, the increase in detected capacitance at specific locations or at specific keyboard keys 164 of the removable tactile input layer 162-1 162-2, 162-3 due to the presence of the pieces of conductive material may serve as capacitive encoding to inform the capacitive sensor microprocessor 176 of which of the plurality of removable tactile input layers 162-1 162-2, 162-3 is currently installed. Having identified the location of the individual sections or pieces of the conductive material of the first set of conductive material 170-1, this location data may also be referenced by the capacitive sensor microprocessor 176 executing the dynamic key mapping engine 180 from the tactile input layer capacitance look-up table 186 in order to cross-reference which the plurality of removable tactile input layers 162-1 162-2, 162-3 is currently installed on the base portion of the information handling system. In an embodiment, the pieces of conductive material of the sets of conductive material 170-1, 170-2, 170-3 may be placed anywhere within the removable tactile input layers 162-1 162-2, 162-3 including peripheral locations around the keyboard keys 164 or other I/O devices. In an specific example embodiment, the pieces of conductive material may be placed under one or more keycaps of the keyboard keys 164 within the removable tactile input layers 162-1 162-2, 162-3 such that their specific arrangement at these keyboard keys 164 may operate as capacitive encoding to inform the capacitive sensor microprocessor 176, via detected increases in capacitance, which of the plurality of removable tactile input layers 162-1 162-2, 162-3 is currently installed on the sealed input surface 172. It is appreciated that the pieces of conductive material of the sets of conductive material 170-1, 170-2, 170-3 may be made of any conductive material such as copper plating or any other type of metal plating, carbon, and the like. In other embodiments, the keycaps may be made of a metal such as aluminum. In some embodiments, the variation in the type of conductive material used for the sets of conductive material 170-1, 170-2, 170-3 may vary such that this specific variance in detected capacitance by the one or more capacitive pad sensors may further be used by the capacitive sensor microprocessor 176 to identify the specific installed removable tactile input layer 162-1 162-2, 162-3 via the tactile input layer capacitance look-up table 186.

Further, execution of the machine readable code instructions of the dynamic key mapping engine 180 by the capacitive sensor microprocessor 176 may, upon detecting a change or switching from one removable tactile input layer 162-1 162-2, 162-3 to another, provide for reassignment of the functions of keyboard keys 164 and other I/O devices based on the determined removable tactile input layer 162-1 162-2, 162-3. For example, a user may switch from a QWERTY-type keyboard layout of a first removable tactile input layer 162 to other types of keyboard key layouts that include, for example, Dvorak simplified keyboard, a Colemak keyboard, AZERTY keyboard, a QWERTZ keyboard, a Japanese Industrial Standard (JIS) keyboard, Hangul keyboard, and other language-specific layouts, region-specific layouts, task-specific layouts, and specialized keyboard layouts of a second removeable tactile input layer 162-2 or third removeable tactile input layer 162-3. Thus, after detecting the set of conductive material 170-1, 170-2, 170-3, the capacitive sensor microprocessor 170, executing the dynamic key mapping engine 172, may know the layout of the keys of the installed removable tactile input layer 162-1 162-2, 162-3 and assign each of the plurality of capacitive sensors in the capacitive pads layer 166 the appropriate input characteristics based on the detected type of keyboard layout on the installed removable tactile input layer 162. These input characteristics are then relayed to the hardware processor 102 for appropriate reassignment of output from the capacitive sensor microprocessor 176 to specific inputs at the hardware processor 102.

In an embodiment, the sealed input surface 172 may include an active shielding layer 182 to shield the plurality of capacitive sensor pads within the capacitive pads layer 166 from a grounding layer 184 serving as an electromagnetic interference (EMI) and grounding for the split-keyboard structure of the keyboard 152. In an embodiment, the active shielding layer 182 acts to prevent electric fields at the capacitive pad sensors from directly being grounded by nearby ground sources such as grounding layer 184, thereby parasitically grounding the capacitive field of the capacitive pad sensors. As described herein, the active shielding layer 182 forces electric fields to go around the shielding pads of the active shielding layer 182 in order to reach ground thereby maintaining the capacitive reach of the capacitive pad layers. If the active shielding layer 182 was not present, the sensing range of the capacitive sensor pads of the capacitive pads layer 174 will be reduced as the electric fields will be directed to ground in parasitic capacitive grounding with the grounding layer 184. In an embodiment, the shielding pads of the active shielding layer 182 may be raised to the same or similar voltage potential as the capacitive sensor pads. When the capacitive sensor pads and shielding pads have the same voltage potential this thereby prevents parasitic capacitive grounding of the electric field from forming between the capacitive pad sensors and the grounding layer 184. In an embodiment, the active shielding layer 182 may be operatively coupled to a voltage source as controlled by the capacitive sensor microprocessor 176 such that the voltage level of the active shielding in the active shielding layer 182 is held at about that of the capacitive sensing pads of the capacitive pads layer 174 to prevent grounding of the capacitive sensing pads by the grounding layer 184. This grounding layer 184 is used for split-keyboard structure of the keyboard 152 grounding and EMI and noise shielding, but due to the thin profile of the keyboard sensing hardware structure 173 formed under the sealed input surface 172, is potentially close to the capacitive sensing layer 174 and may disrupting the operation of the plurality of capacitive pad sensors (e.g., carbon pads) within the capacitive pads layer 174 via parasitically grounding capacitance of those capacitive sensing pads from detecting other capacitive changes due to user inputs. This active shielding layer 182 may be driven using the same voltage as the plurality of capacitive pad sensors within the capacitive pads layer 174 in some embodiments. This reduces parasitic capacitance between the plurality of capacitive pad sensors of the capacitive pads layer 174 and the grounding layer 184 placed below the active shielding layer 182. Thus, the active shielding layer 182 improves signal-to-noise ratio and extends capacitive sensing range of the plurality of capacitive pad sensors of the capacitive pads layer 174 in the keyboard sensing hardware structure 173 formed under the sealed input surface 172.

In an embodiment, a grounding layer 184 is placed below the sealed input surface 172 and may prevent EMI interference with components within the information handling system 100 as well as the internal components of the information handling system 100 from interfering with outside devices and structures. Incoming radiofrequencies to the base chassis of the information handling system 100 will be grounded and stopped from causing EMI interference with internal hardware components and outgoing radiofrequency radiation from the internal components of the information handling system 100 will be grounded to not interfere with other devices and to meet compliance. The grounding layer 184 may also absorb or redirect stray capacitive coupling or leakage current that might affect signal precision at the plurality of capacitive pad sensors as well as serve as a safety grounding source for the electronic components of the split-keyboard structure of the keyboard 152. In an embodiment, the grounding layer 184 may provide a stable electrical reference for the active circuitry of the keyboard sensing hardware structure 173 formed under the sealed input surface 172 and help to define signal baseline at the plurality of capacitive sensors. It is appreciated that other hardware components of the information handling system 100 may be placed below the ground layer 184 that may include an information handling system hardware mainboard that may house the hardware processor 102, other processing devices (e.g., 104, 106, 108, 110), the PMU 130, the wireless interface adapter 134, the radio 136, the RF front end 138, and the antenna 140 among other hardware components. Thus, the grounding layer 184 may prevent any EMI and noise from those hardware components also from affecting the operation of the capacitive pads layer 174 as described herein. Still further, the grounding layer 184 may prevent incoming radio frequency radiation of the exterior EMI from interfering with these internal hardware components.

The systems and methods described herein, therefore, provides for a split-keyboard structure of a keyboard 152 that can operate even when contaminants are accidentally introduced into the removable tactile input layers 162-1 162-2, 162-3 such as liquids. If damaged, the mechanical keyboard keys 164 of the removable tactile input layers 162-1 162-2, 162-3 may be removed and replaced with another removable tactile input layer 162-1 162-2, 162-3 for use with the keyboard sensing hardware structure 173 formed under the sealed input surface 172 and without replacement of the electronics for sensing keypress, touch, and touchless gesture inputs in embodiments herein. By bifurcating the split-keyboard structure of the keyboard 152 into a purely mechanical removable tactile input layer 162-1 162-2, 162-3 and the keyboard sensing hardware structure 173 formed under the sealed input surface 172, damage to the split-keyboard structure of the keyboard 152 can be limited, from a spill for example, to the removable tactile input layer 162-1 162-2, 162-3. The electronic devices of the keyboard sensing hardware structure 173 formed under the sealed input surface 172 in split-keyboard structure of the keyboard 152 and the hardware components of the information handling system 100 remain sealed within the sealed input surface 172 protected from damage. Still further, the split-keyboard structure of the keyboard 152 of the present specification also provides for a swappable removable tactile input layer 162-1 162-2, 162-3 that allows for repair or replacement of the removable tactile input layer 162-1 162-2, 162-3 if and when contaminants have been introduced into the mechanical parts of the removable tactile input layer 162-1 162-2, 162-3. Even further, the split-keyboard structure of the keyboard 152 of the present specification also provides for a swappable removable tactile input layer 162-1 162-2, 162-3 that accommodates for different types of keyboard layouts thereby accommodating for various typists who are using the information handling system 100. Because of the layout of the various layers of the split-keyboard structure of the keyboard 152, the split-keyboard structure of the keyboard 152 may not only operate with the keyboard sensing hardware structure 173 formed under the sealed input surface 172 to recognize tactile input such as a keypress or touch input at the removable tactile input layer 162-1 162-2, 162-3 but may also recognize when a user's fingers are hovering over the keys of the split-keyboard structure of the keyboard 152 and above those keys in a touchless gesture function. This allows for touchless gestures as well as touch inputs and keypresses to be received at the split-keyboard structure of the keyboard 152 sensed by contactless capacitive sensing with the keyboard sensing hardware structure 173 formed under the sealed input surface 172. Touch input and touchless gestures may include swiping gestures and the like in order to provide various different types of input at the removable tactile input layer 162-1 162-2, 162-3 of the split-keyboard structure of the keyboard 152 than other keyboards may be capable of receiving.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
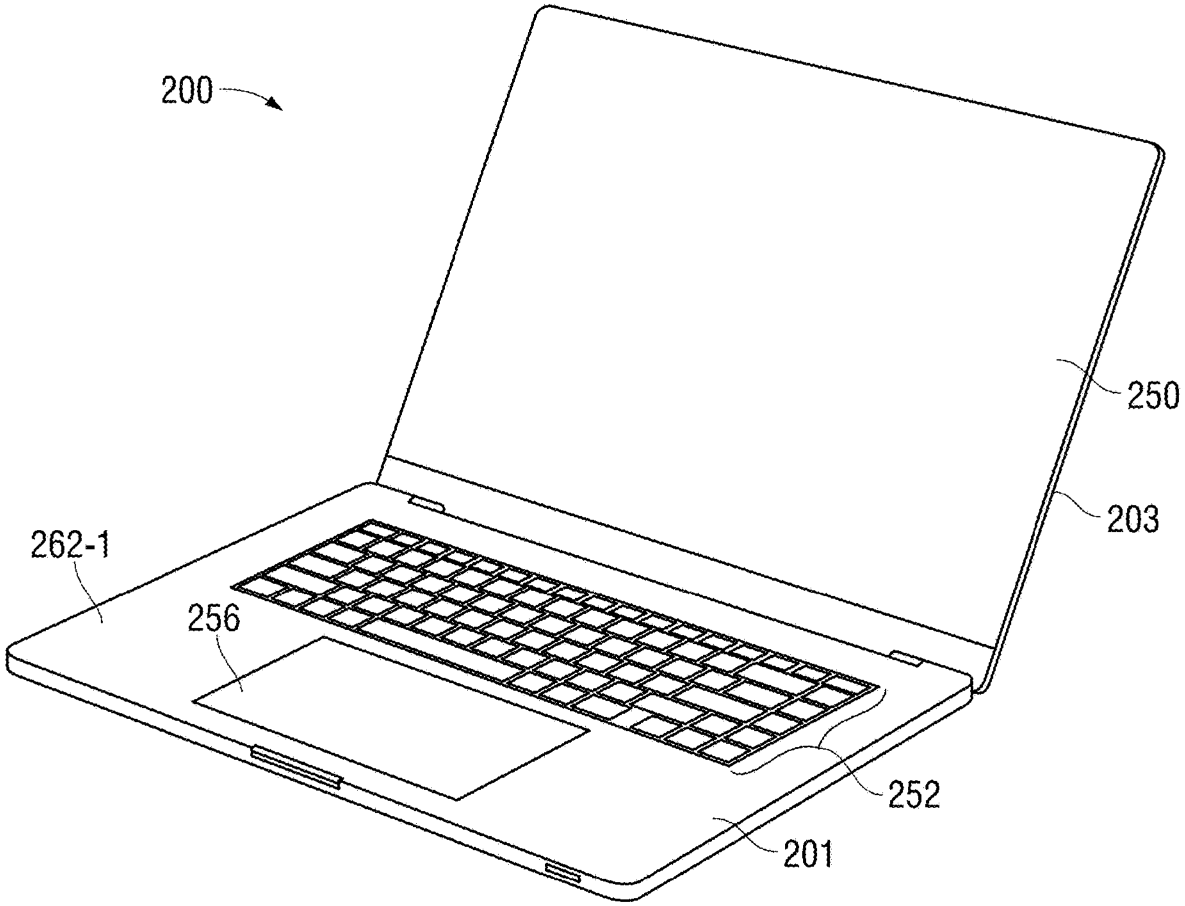
FIG. 2A is a graphic diagram illustrating an information handling system that includes a split keyboard stack structure having a removable tactile input layer and a separate sealed input surface having a keyboard sensing hardware structure formed under the sealed input surface to receive keyboard, touch and gesture input from a user according to an embodiment of the present disclosure.

FIG. 2A is a graphic diagram illustrating an information handling system 200 that includes a split-keyboard structure that includes an installed removable tactile input layer 262-1 and a separate keyboard sensing hardware structure formed under a sealed input surface to receive keyboard, touch, and gesture input contactlessly at capacitive pad sensors from a user according to an embodiment of the present disclosure. As described herein, the information handling system 200 may be a laptop-type information handling system 200. The laptop-type information handling system 200 may include a base chassis 201, also referred to as a keyboard chassis, and a display chassis 203. Therefore, FIG. 2A shows a lid portion of the laptop-type information handling system 200 that is a display chassis 203 that includes a video/graphics display device 250 to provide output to the user and for the user to provide input in those embodiments where the video/graphics display device 250 is a touchscreen display device. The laptop-type information handling system 200 also includes a base chassis 201, hinged to the display chassis 203, that may house information handling system hardware components as described in connection with FIG. 1 as well as various ports. The base chassis 201 in various embodiments further includes the separate keyboard sensing hardware structure formed under a sealed input surface (not shown) of the base chassis 201 and have a separate mechanical removable tactile input layer installed on top of the sealed input surface of the base chassis 201 according to embodiments herein.

In an embodiment, the base portion 201 of the laptop-type information handling system 200 may include the keyboard structure 252 in the removable tactile input layer 262-1 forming a first portion of the split-keyboard structure as described in embodiments herein. FIG. 2A shows a first removable tactile input layer 262-1 that has been coupled or otherwise installed to a sealed input surface (not shown) as described in connection with FIG. 1. As described herein, the first removable tactile input layer 262-1 may include a keyboard structure 252 that may be any of a QWERTY-type keyboard layout of a first removable tactile input layer 262-1 to other types of keyboard key layouts that include, for example, Dvorak simplified keyboard, a Colemak keyboard, AZERTY keyboard, a QWERTZ keyboard, a Japanese Industrial Standard (JIS) keyboard, Hangul keyboard, and other language-specific layouts, region-specific layouts, task-specific layouts, and specialized keyboard layouts. Each of these different layouts may be detected using the conductive material of the set of conductive material that forms capacitive encoding to identify a keyboard layout, keyboard language, or type of keyboard installed as a removable tactile input layer 262-1 described in connection with FIG. 1 herein. By detecting the conductive material, the capacitive sensor microprocessor, executing the dynamic key mapping engine, may determine from the capacitive encoding which of a plurality of removable tactile input layers, e.g., 262-1, is operatively coupled to the sealed input surface and, therefore, the layout of the keyboard keys of the attached removable tactile input layer 262-1 and assign each of the plurality of capacitive sensors in the capacitive pads layer the appropriate input characteristics based on the detected type of keyboard layout on the installed removable tactile input layer 262-1. In addition to detecting the conductive material of the capacitive sensor pads for capacitance changes, the capacitive driver can activate all of the capacitive sensor pads interconnected in a different measurement phases and cause the entire keyboard structure 252 in the removable tactile input layer 262-1 to operate as a large sensor consisting of all the capacitive sensor pads. In an example embodiment, large groups or all of the capacitive pad sensors may be connected in parallel to the capacitive sensor driver. In this example embodiment, this large sensor may be capable of measuring the total capacitance of the conductive material (e.g., the keyboards structure itself or with additional metal pieces included) within the installed keyboard structure 252 in the removable tactile input layer 262-1. Every of the removable tactile input layers 262-1 might include a different total capacitance due to different sizes, layouts, and numbers of conductive material pieces or portions added within the housing of the removable tactile input layer 262-1 (e.g., under one or more keyboard keys).

FIG. 2A also shows a trackpad 256 installed in the base portion of the laptop-type information handling system 200. This trackpad 256 may also be used by the user to provide input to the information handling system 200. In an embodiment, the trackpad 256 may form part of the first removable tactile input layer 262-1 and may operate similarly to those keyboard keys present within the keyboard structure 252 of the first removable tactile input layer 262-1 and be contactlessly detected by the separate keyboard sensing hardware structure formed under a sealed input surface in some embodiments. Alternatively, the trackpad 256 may form a different part of the top layer of the base chassis 201 of the information handling system 200 and may operate independently of the keyboard structure 252 that forms the first removable tactile input layer 262-1. In the latter embodiment, the trackpad 256 operates to receive touch and clicks at the surface of the trackpad 256 with the trackpad 256 and includes trackpad electrical circuits to receive that input.

Figure 2B:
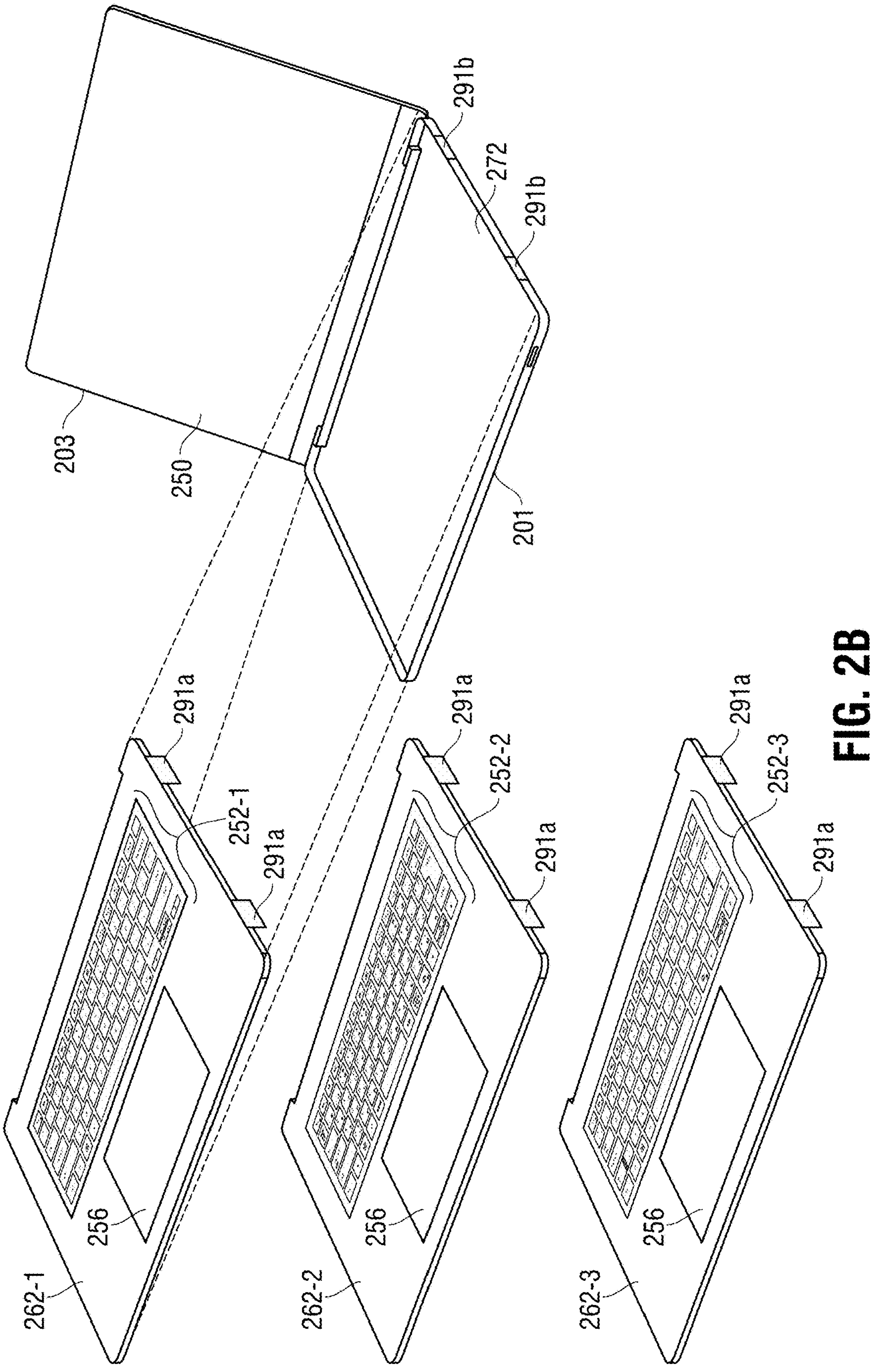
FIG. 2B is a graphic diagram illustrating an information handling system that includes an exploded depiction of plural keyboard removable tactile input layers with capacitive encoding that are interchangeably couplable to the sealed input surface having a keyboard sensing hardware structure formed thereunder according to an embodiment of the present disclosure.

FIG. 2B is a graphic diagram illustrating an information handling system that includes an exploded depiction of a plurality of keyboard removable tactile input layers removable tactile input layers 262-1, 262-2, 262-3, that are interchangeably couplable to the sealed input surface 272 having a keyboard sensing hardware structure formed thereunder according to an embodiment of the present disclosure. As shown in FIG. 2B, the removable tactile input layers 262-1, 262-2, 262-3 have been removed from the information handling system 200 to show the sealed input surface 272 of the base chassis 201 of the information handling system 200. The removable tactile input layers 262-1, 262-2, 262-3 are shown as installable onto the sealed input surface 272 of the base chassis 201 of information handling system 200 according to various embodiments herein. In a further embodiment, the exposed sealed input surface 272, after removing any optional removable tactile input layers 262-1, 262-2, 262-3, can act as a large touch pad with or without those removable tactile input layers 262-1, 262-2, 262-3.

In an embodiment, the first removable tactile input layer 262-1 including a keyboard structure 252 may be swapped with other removable tactile input layers 262-2, 262-3 that may include a second removable tactile input layer 262-3 that includes a different keyboard key layout or a third removable tactile input layer 262-3 that includes yet another keyboard key layout. It is appreciated that the first removable tactile input layer 262-1, the second removable tactile input layer 262-2, and the third removable tactile input layer 262-3 may be only three examples of swappable removable tactile input layers 262-1, 262-2, 262-3 that may be affixed to the top of the sealed input surface 272 using, for example, reciprocal removable tactile input layer coupling system structures 291*a* and 291*b*. It is also appreciated that the first removable tactile input layer 262-1, the second removable tactile input layer 262-2, and the third removable tactile input layer 262-3 may not only include different types of keyboard key layouts, but may also include other types of input devices that may include, for example, a drawing pad, a touch pad, a control pad with a number of dials or a number of sliders, and the like that allow for different types of input to the information handling system 200. It is appreciated that when the first removable tactile input layer 262-1, the second removable tactile input layer 262-2, or the third removable tactile input layer 262-3 has been removed from the sealed input surface 272, the sealed input surface 272 may also operate as a large touch pad that the user may interact with in order to provide input to the information handling system 200. Indeed, in an embodiment, because the sealed input surface is formed above the keyboard sensing hardware structures (e.g., FIG. 1, 173) and include a plurality of capacitive sensor pads of the capacitive pads layer (e.g., FIG. 1, 174), those capacitive sensor pads may detect the presence and touch of the user's hands and fingers such that the user may capacitively interact with the keyboard sensing hardware structures with or without the first removable tactile input layer 262-1, the second removable tactile input layer 262-2, and the third removable tactile input layer 262-3 placed over the sealed input surface 272.

In an embodiment, each of the first removable tactile input layer 262-1, second removable tactile input layer 262-2, and the third removable tactile input layer 262-3 may include a removable tactile input layer coupling system structure 291*a*, such as a latch, latch receiver, interference fit structures, magnetic structures, or the like. In an embodiment, the coupling system structure 291*a* could be integrated into each of the first removable tactile input layer 262-1, second removable tactile input layer 262-2, and the third removable tactile input layer 262-3. This removable tactile input layer coupling system structure 291*a* interfaces with reciprocal matching removable tactile input layer coupling system structure 291*b* formed on the base chassis 201 or in the sealed input surface 272 of the base chassis 201 of information handling system 200. Interfacing of reciprocal removable tactile input layer coupling system structures 291*a* and the matching removable tactile input layer coupling system structure 291*b* may be formed along, for example, a periphery of the removable tactile input layers 262-1, 262-2, 262-3 and the sealed input surface 272 or along a bottom surface of the frame or tray support structure of the removable tactile input layers 262-1, 262-2, 262-3 and a top surface area of the sealed input surface 264 of the base chassis 201. Additional embodiments may include reciprocal or matching removable tactile input layer coupling system structures 291-*b* formed on a side of base chassis 201 of information handling system 200. It is appreciated that any type of reciprocal removable tactile input layer coupling system structures 291*a* and 291*b* may be used to selectively secure any of the various removable tactile input layers 262-1, 262-2, 262-3 to the sealed input surface 272. The reciprocal removable tactile input layer coupling system structures 291_a_ and 291_b_ may include any latch, fastener, interference fit edges, grooves or other interference fit structures, or other mechanical device that the user may access to remove the first removable tactile input layer 262-1, the second removable tactile input layer 262-2, and/or the third removable tactile input layer 262-3 from the sealed input surface 272 of the base chassis 201.

In an embodiment, the first removable tactile input layer 262-1 may include a keyboard structure 252 with any number and layout of keyboard keys that include mechanical tactile feedback structures only. Plural removable tactile input layers 262-1, 262-2, 262-3 with a variety of keyboard layouts may be selectively installed on the sealed input surface 272. Installation may occur using reciprocal removable tactile input layer coupling system structures 291_a_ and 291_b_ located on the removable tactile input layers 262-1, 262-2, 262-3 with reciprocal structure on, in, or under the sealed input surface 272. Each of the removable tactile input layers 262-1, 262-2, 262-3 may then operate with the separate keyboard sensing hardware structure formed under a sealed input surface 272 after being installed to receive keyboard, touch and gesture input contactlessly at capacitive pad sensors therein. The keyboard layout of each of these removable tactile input layers 262-1, 262-2, 262-3 include tactile input layer identification structures or devices such as the set of conductive materials (e.g., FIG. 1, 170-1, 170-2, 170-3) that provide for capacitive encoding. The capacitive encoding that is provided by the set of conductive materials (e.g., FIG. 1, 170-1, 170-2, 170-3) may be detected by the capacitive pad sensors of the capacitive pads layer (e.g., FIG. 1, 174) in the separate keyboard sensing hardware structure formed under a sealed input surface 272 according to various embodiments described. The capacitive encoding of the set of conductive materials used herein to identify the type of keyboard layout of keyboard structure 252 for the installed removable tactile input layer 262-1, 262-2, 262-3 may be detected and the capacitive sensor microprocessor executing machine readable code instructions of the dynamic key mapping engine may determine what type of keyboard is installed or whether that removable tactile input layer includes a keyboard structure 252 or not.

In an embodiment, a removable tactile input layer 262-1, 262-2, 262-3 may include a control surface that allows a user to provide a different type of control and input to the information handling system 200. This may include any number of keyboard key layouts as well as knobs, slides, and touch surfaces that allows the user to provide such input. Again, removable tactile input layer identification structures or devices, such as the set of conductive material (FIG. 1, 170-1) described herein, that may be detected by capacitive pad sensors in the separate keyboard sensing hardware structure (e.g., FIG. 1, 173) formed under a sealed input surface 272 may determine among the plural removable tactile input layers 262-1, 262-2, 262-3 via the capacitive sensor microprocessor executing machine readable code instructions of the dynamic key mapping engine according to various embodiments described herein that has been installed.

In an embodiment, other removable tactile input layers may include a drawing surface or the sealed input surface may receive touch drawing inputs directly without a removable tactile input layer (not shown). Similarly, the removable tactile input layer may be a control board with knobs, sliders, or other input structures. The drawing surface or drawing pad may allow a user to provide touch input at the removable tactile input layer to, for example, provide drawing strokes at the drawing pad. The control board may allow a user to provide inputs at the removable tactile input layer to, for example, provide specific inputs for software applications that require knobs, slider switches, or other control board apparatus inputs in embodiments herein. It is appreciated that because the sealed input surface 272 and lower stacks within the base portion of the information handling system 200 includes capacitive sensors, the user may provide both tactile input at the drawing pad or control board as well as gesture input above the surface of the drawing pad or control board to provide different types of input. Again, removable tactile input layer identification structures or devices, such as the set of conductive material (FIG. 1, 170-1) described herein, that may be detected as capacitive encoding as well by capacitive pad sensors in the separate keyboard sensing hardware structure (FIG. 1, 173) formed under a sealed input surface 272 according to various embodiments described herein to identify the removable tactile input layer as a drawing surface or control board removable tactile input layer that is installed.

Figure 2C:
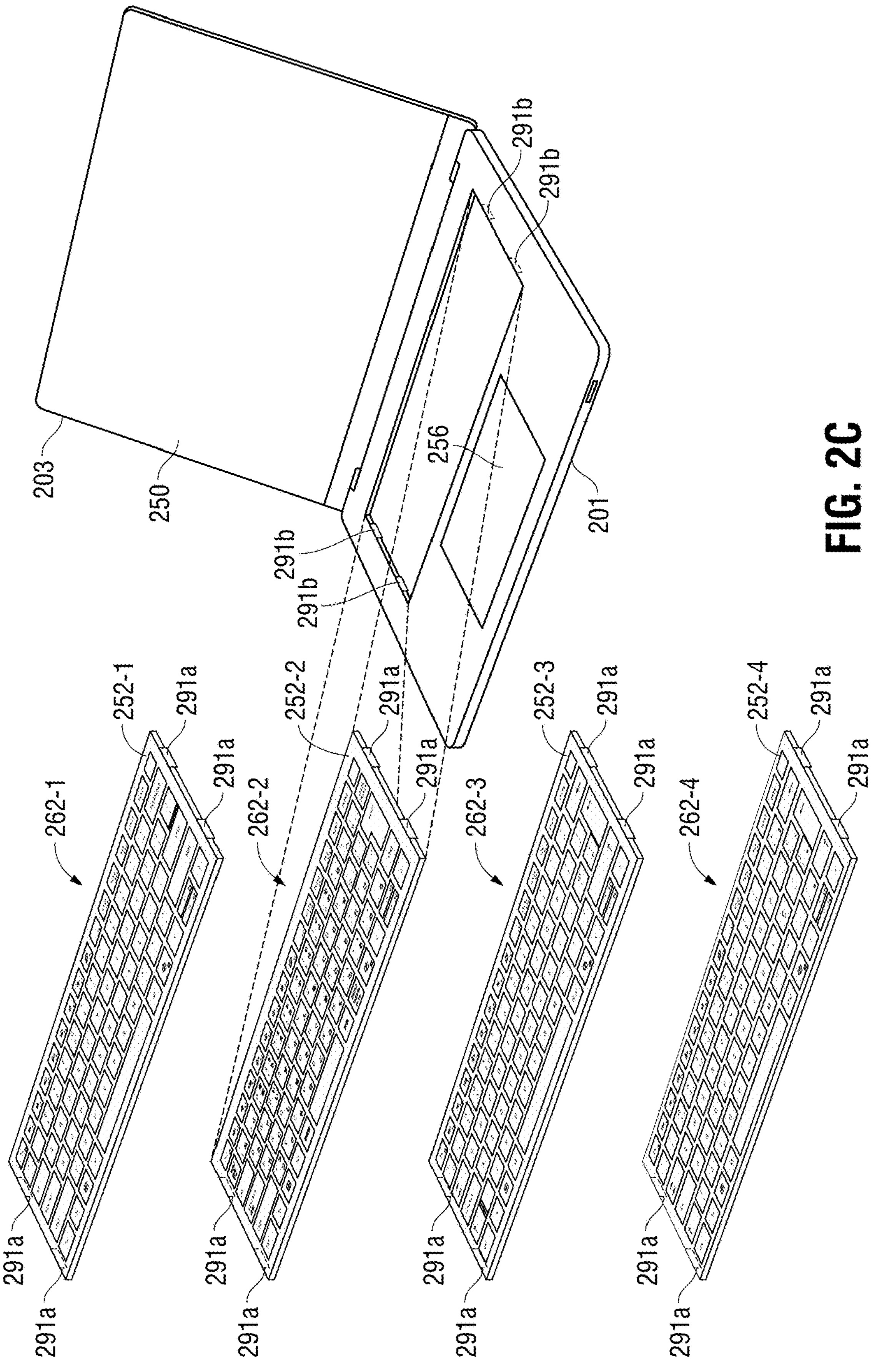
FIG. 2C is a graphic diagram illustrating an information handling system that includes an exploded depiction of plural keyboard removable tactile input layers with capacitive encoding that are interchangeably couplable to the sealed input surface having a keyboard sensing hardware structure formed under the sealed input surface according to another embodiment of the present disclosure.

FIG. 2C is a graphic diagram illustrating an information handling system 200 that includes an exploded depiction of a plurality of keyboard removable tactile input layers, that are interchangeably couplable to the sealed input surface within a recess formed in a top surface cover (e.g., c-cover) of the base chassis 201 and having a keyboard sensing hardware structure formed thereunder according to an embodiment of the present disclosure. Similar to FIGS. 2A and 2B, FIG. 2C shows a lid portion of the laptop-type information handling system 200 that is a display chassis 203 that includes a video/graphics display device 250 to provide output to the user and for the user to provide input in those embodiments where the video/graphics display device 250 is a touchscreen display device. The laptop-type information handling system 200 also includes a base chassis 201, hinged to the display chassis 203, that may house information handling system hardware components as described in connection with FIG. 1 as well as various ports. The base chassis 201 according to various embodiments further includes the separate keyboard sensing hardware structure formed under a sealed input surface (not shown) of the base chassis 201 and have one or more separate mechanical removable tactile input layers installed on top of the sealed input surface of the base chassis 201 and within a well or tray area over the sealed input surface 272 according to embodiments herein.

FIG. 2C also shows four different removable tactile input layers 262-1, 262-2, 262-3, 262-4. These removable tactile input layers 262-1, 262-2, 262-3, 4 include different keyboard structures 252-1, 252-2, 252-3, 252-4 that each have a unique keyboard key layout. Further, each of the different keyboard structures 252-1, 252-2, 252-3, 252-4 may be formed in a tray or support frame structure to comprise the four different removable tactile input layers 262-1, 262-2, 262-3, 262-4 in embodiments herein. As described herein, any of a QWERTY-type keyboard, a Dvorak simplified-type keyboard, a Colemak-type keyboard, an AZERTY-type keyboard, a QWERTZ-type keyboard, a Japanese Industrial Standard (JIS)-type keyboard, a Hangul-type keyboard, and other language-specific layouts, region-specific layouts, task-specific layouts, and specialized keyboard layouts may be used as a keyboard structure 252-1, 252-2, 252-3, 252-4 of the various removable tactile input layers 262-1, 262-2, 262-3, 262-4.

As described herein, each of the removable tactile input layers 262-1, 262-2, 262-3, 262-4 may be swapped out with another removable tactile input layers 262-1, 262-2, 262-3, 262-4 and secured within the well or opening of the c-cover to the sealed input surface 272. The frame of the four different removable tactile input layers 262-1, 262-2, 262-3, 262-4 may have a removable tactile input layer coupling system structures 291*a* with reciprocal removable tactile input layer coupling system structures 291*b* formed in sides of the well or opening for the sealed input surface 272, on the sealed input surface 272, or under the sealed input surface 272 for operatively coupling. The reciprocal removable tactile input layer coupling system structures 291*a* and 291*b* may include any press fit structures, latches, fasteners, reciprocal magnets or magnetic material, or other coupling system or device that selectively secures the removable tactile input layers 262-1, 262-2, 262-3, 262-4 to the surface of the sealed input surface 272. For example, the edge of a tray or well for the sealed input surface 272 may include a lip or indentation with a reciprocal indentation or lip on the fame of the four different removable tactile input layers 262-1, 262-2, 262-3, 262-4 to provide for a press fit operative coupling to the sealed input surface 272 in one embodiment. In another embodiment, the sealed input surface 272 may include a latch structure or latching structure with a reciprocal latch or latching structure on the frame or bottom surface of the four different removable tactile input layers 262-1, 262-2, 262-3, 262-4 to provide for a latched operative coupling to the sealed input surface 272 in another embodiment. In yet other embodiments, the sealed input surface 272 may include a magnet or ferromagnetic material formed underneath or embedded within and a reciprocal magnet or ferromagnetic structure may be embedded in the frame or bottom surface of the four different removable tactile input layers 262-1, 262-2, 262-3, 262-4 to provide for a magnetic operative coupling to the sealed input surface 272. In yet other embodiments, reciprocal fasteners such as a screw and threaded receiver or push-in post attachment may be used for operative coupling of the four different removable tactile input layers 262-1, 262-2, 262-3, 262-4 to the sealed input surface 272.

Figure 3:
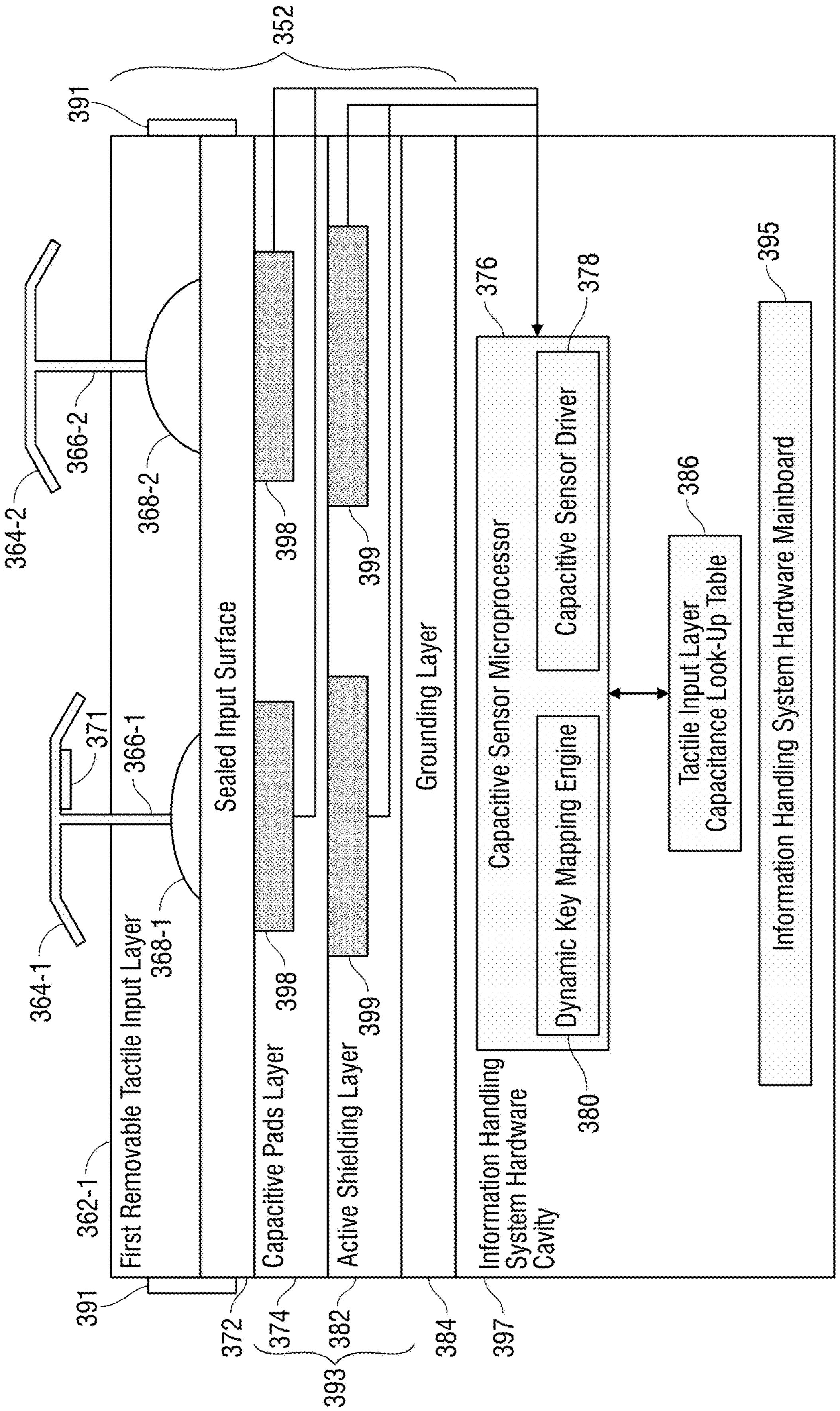
FIG. 3 is a graphic diagram illustrating a keyboard stack that includes a first removable tactile input layer and a separate sealed input surface to receive keyboard, touch, and gesture input from a user contactlessly at capacitive pad sensors in a keyboard sensing hardware structure formed under the sealed input surface and to capacitive encoding to detect which of a plurality of removable tactile input layers is installed on the sealed input surface according to an embodiment of the present disclosure.

FIG. 3 is a graphic diagram illustrating a keyboard stack that includes a first removable tactile input layer 362-1 and a separate sealed input surface 372 to receive keyboard, touch and gesture input from a user contactlessly at capacitive pad sensors 398 in a keyboard sensing hardware structure 393 formed under the sealed input surface 372 and to detect which of a plurality of removable tactile input layers 362-1 is operatively coupled to the sealed input surface 372 according to an embodiment of the present disclosure. As described herein, the split-keyboard structure stack up includes a keyboard structure 352 as part of the first removable tactile input layer 362-1 and may further include a number of separate layers that form the keyboard sensing hardware structure 393 formed under the sealed input surface 372 to detect actuation of any given keyboard key 364-1, 364-2 and gestures above the first removable tactile input layer 362-1 made by the user.

The keyboard sensing hardware structure 393 includes interface detection electronics, such as capacitive pad sensors 398, and operates to contactlessly detect user input received on or above the first removable tactile input layer 362-1 through which the user may provide input into the information handling system. The first removable tactile input layer 362-1 may be that layer that a user interacts with via keypress of mechanical keyboard keys 364-1, 364-2 of keyboard structure 352, touch input, or touchless gesture input above to provide input to the information handling system. This first removable tactile input layer 362-1 may include only mechanical elements such as mechanical keyboard keys 364-1, 364-2 of keyboard structure 352 formed into a grid, frame, or tray support structure of suitable material, such as plastic or ABS, to provide tactile response to the user when the mechanical keyboard key 364-1, 364-2 are pressed. In a specific example, the first removable tactile input layer 362-1 may include a keycap or keyboard key 364-1, 364-2 that includes a keyboard key post 366-1, 366-2. The keyboard key 364-1, 364-2 and keyboard key post 366-1, 366-2 may be operatively and mechanically coupled to a keyboard key rubber dome 368-1, 368-2 or popple. In this example embodiment, instead of the keyboard key rubber dome 368-1, 368-2 having a switch or activating a switch on a PCB, the keyboard key rubber dome 368-1, 368-2 may be used to help provide tactile feedback to the user such that the mechanical features imitate typical interactions with other types of keyboards. In some example embodiments, the first removable tactile input layer 362-1 may also include scissor or butterfly arms (not shown) that also provide tactile feedback to the user while facilitating the recoil of the keyboard key 364-1, 364-2 and keyboard key post 366-1, 366-2 upwards for the keyboard structure 352. Thus, in the first removable tactile input layer 362-1 provides a simulated tactile feel to the user such that the user may feel when actuating the keys on any keyboard, however the first removable tactile input layer 362-1, which may include the keyboard structure 352, may be easily replaced without replacement of keyboard electronics should damage occur to any of the keyboard key 364-1, 364-2.

Thus, the first removable tactile input layer 362-1 does not include any electrical elements that are used to receive electrical signals as the user presses any keyboard key 364-1, 364-2. Therefore, in the embodiments herein, the first removable tactile input layer 362-1 does not include a PCB layer, a flexible PCB layer, contact switches or other electrical keypress detectors, or other electrical components that other keyboards may use to detect the press of a key by the user. Instead, in the embodiments herein, any number of removable tactile input layers, which may include a keyboard structure 352 without electrical keyboard components in some embodiments, operate with a separate keyboard sensing hardware structure 393 formed under the sealed input surface 372 that includes interface detection electronics, such as capacitive pad sensors 398, that can contactlessly detect user input.

In one embodiment shown in FIG. 3, the first removable tactile input layer 362-1 may be coupled to the capacitive pads layer 374 using removable tactile input layer coupling system structures 391 that are reciprocal structures on both the first removable tactile input layer 362-1 and on, in, or under the sealed input surface 372 (e.g., FIGS. 2A-2C 291*a* and 291*b*) (or on, in or within the base chassis). In embodiments herein, the reciprocal removable tactile input layer coupling system structures 391 may include reciprocal latching mechanisms, reciprocal interference fit structures, reciprocal magnetic devices, or other coupling devices that allows user to couple and decouple the first removable tactile input layer 362-1 to the sealed input surface 372 or the base chassis. This reciprocal removable tactile input layer coupling system structures 391 such as reciprocal latching mechanism structures, reciprocal interference fit structures, reciprocal magnetic devices, or other coupling structures allow a user to quickly decouple the first removable tactile input layer 362-1 from the sealed input surface 372 in order to repair the first removable tactile input layer 362-1 or replace the first removable tactile input layer 362-1 with a different removable tactile input layer (e.g., FIG. 1, 162-2, 1662-3) as described herein. In an example embodiment, this reciprocal removable tactile input layer coupling system structures 391 may be a reciprocal latching mechanism that may include small, molded tabs integrated into the first removable tactile input layer 362-1 that engage with matching recesses, slots, or holes formed in the sealed input surface 372 or on the base chassis. It is appreciated that other mechanical devices or mechanical structures may be used to selectively secure the first removable tactile input layer 362-1 to the sealed input surface 372 including rotational latches, magnetic latching mechanisms, hook-and-slot latches, slide locking latches, interference fit grooves or extensions on the perimeter of tray or grid of the first removable tactile input layer 362-1 that interference fit with a frame or edge of the sealed input surface 372, and other latching or interference fit structures.

In an alternative example embodiment, the first removable tactile input layer 362-1 may be installed onto and operatively coupled to the sealed input surface 372 using an adhesive layer (not shown). This adhesive layer may include any type of glue, tape, or other adhesive that may, at least temporarily, adhere a bottom surface of the first removable tactile input layer 362-1 to a top surface of the sealed input surface 372 that includes the keyboard sensing hardware structure 393 formed under the sealed input surface 372.

As described herein, a separate half of the split-keyboard structure includes the keyboard sensing hardware structure 393 formed under the sealed input surface 372. The keyboard sensing hardware structure 393 formed under the sealed input surface 372 includes, as a top layer, the capacitive pads layer 374. The sealed input surface 372 prevents contaminants and liquids from entering into the remaining portions of the keyboard housing or base chassis of the information handling system. The sealed input surface 372 protects the electronics, such as carbon capacitive pad sensors 398 and circuitry, of the keyboard sensing hardware structure 393 formed under the sealed input surface 372 as well as protecting hardware components, such as a motherboard, hardware processors, memory and other hardware components as described with reference to FIG. 1, that are disposed in the base chassis of the information handling system. This capacitive pads layer 374, an active shielding layer 382, and a grounding layer 384 of the keyboard sensing hardware structure 393 formed under the sealed input surface 372 may be formed, for example, on a flexible PCB circuit with a plurality of capacitive pad sensors 398 formed on or at the top surface of this flexible PCB circuit. In an alternative embodiment, the capacitive pad sensors 398 may be formed on a bottom surface of the sealed input surface 372 as shown in FIG. 3. Thus, in an embodiment, the sealed input surface 372 may be made of a flexible PCB, a PCB, a plastic, an ABS, or a transparent plastic to, for example, allow for key illumination via backlighting under the sealed input surface 372. The capacitive pad sensors 398 may be formed on an underside of the sealed input surface 372 such that no conductive capacitive sensors structure or conductive traces are exposed above the sealed input surface 372. In an embodiment, the capacitive pad sensors 398 may include patches of deposited carbon on the bottom surface of the flexible PCB circuit, PCB, or other surface that forms the sealed input surface 372. The capacitive pad sensors 398 are configured to vary an electric field in response to changes in nearby capacitance. These carbon-based patches may be arranged in a sensor matrix and, during manufacturing, may be printed, sputtered, or otherwise deposited on the bottom surface of the sealed input surface 372. In an embodiment, the array of deposited carbon patches may be arranged such that each keyboard key 364-1, 364-2 of the first removable tactile input layer 362-1 aligns vertically above the sealed input surface 372 and a deposited capacitive pad sensor 398 (e.g., carbon patch) formed thereunder.

As described herein, each of the capacitive pad sensors 398 of the capacitive pads layer 374 may be operatively coupled to the capacitive sensor microprocessor 376 executing machine readable code instructions of a capacitive sensor driver 378. In an embodiment, each of the capacitive pad sensors 398 that form the plurality of capacitive sensors within the capacitive pads layer 374 may be operatively coupled to the capacitive sensor microprocessor 376 via carbon traces formed on a bottom surface of the sealed input surface 372 in embodiments described herein. It is also appreciated that other types of traces may be formed to operatively couple the carbon pads of capacitive pad sensors 398 to the capacitive sensor microprocessor 376, such as copper traces or indium tin oxide (ITO), that allow each of the carbon pads of the capacitive pad sensors 398 to conduct signals to the capacitive sensor microprocessor 376 for detection and determination of user input by the execution of the capacitive sensor driver 378. Detection of changes in capacitance at various levels of capacitance change are detected by the capacitive sensor microprocessor 376 and determined by the execution of the capacitive sensor driver 378 as indicative of a user's keypress inputs, a user's touch inputs, or a user's touchless gesture inputs at or near the keyboard keys 364-1, 364-2 or other input surfaces of the keyboard structure 352 or the first removable tactile input layer 362-1. The capacitive sensor driver 378 may be executed by the capacitive sensor microprocessor 376 to detect and determine which of the plurality of keyboard keys 364-1, 364-2 on the first removable tactile input layer 362-1 have been pressed and detected at corresponding capacitive pad sensors 398. The capacitive sensor microprocessor 376 executing machine readable code instructions of the capacitive sensor driver 378 for processing of keystrokes may relay those inputs received at each of the capacitive pad sensors 398 from the capacitive sensor microprocessor 376 to the information handling system hardware mainboard 395 in the information handling system hardware cavity 397. Relay of those keypress inputs, touch inputs, or touchless gesture inputs detected at the capacitive sensor microprocessor 376 are provided as input to any hardware processor on the information handling system hardware mainboard 395 as input to the information handling system executing one or more software or firmware applications.

In some embodiments, the capacitive sensor microprocessor 376 may execute machine readable code instructions of a dynamic key mapping engine 380. Again, embodiments of the present disclosure for the split-keyboard stack up described in FIG. 3 may allow a user to switch types of removable tactile input layers (e.g., first removable tactile input layer 362-1) such that the keyboard key layout of a plurality of keyboard keys 364-1, 364-2 is changed. As described herein, the execution of the dynamic key mapping engine 380 may allow the capacitive sensor microprocessor 376 to determine which of the plurality of removable tactile input layers (e.g., first removable tactile input layer 362-1) is operatively coupled to the sealed input surface 372 of the information handling system. Again, because the first removable tactile input layer 362-1 may be swapped out for one of the second removeable tactile input layer and third removeable tactile input layer (or any other removeable tactile input layer described herein such as in FIG. 2), the capacitive sensor microprocessor 376 executing machine readable code instructions of the dynamic key mapping engine 380 may be used to detect which of the removable tactile input layers is installed. In order to determine which of the plurality of removable tactile input layers is operatively coupled to the sealed input surface 372, each of the removable tactile input layers may include a set of conductive material including conductive material pieces 371 that serve as capacitive encoding that is detectable by one or more of the capacitive pad sensors 398 of the capacitive pads layer 374. In an embodiment, a first set of conductive material comprising conductive material pieces 371 may be formed within the first removable tactile input layer 362-1 to form a unique capacitive encoding for the first removable tactile input layer 362-1 such that detection of a capacitance that is influenced by the inclusion of the conductive material pieces 371 within the first removable tactile input layer 362-1 at a specified capacitance level or detected across particular locations may be referenced in a tactile input layer capacitance look-up table 386 accessed by the capacitive sensor microprocessor 376.

In one example embodiment, during startup of the information handling system, the capacitive sensor microprocessor 376 may determine a cumulative capacitance detected at all of the capacitive pad sensors 398 within the capacitive pads layer 374 when the first removable tactile input layer 362-1 is installed. When reading this cumulative capacitance value, the detected capacitance may be unique to the first removable tactile input layer 362-1 and may be determined by the capacitive sensor microprocessor 376 accessing a tactile input layer capacitance look-up table 386 via execution of the dynamic key mapping engine 380. This tactile input layer capacitance look-up table 386 may include anticipated cumulative capacitance levels that can be matched with a specific type of removable tactile input layer 362-1. In this way, the capacitive sensor microprocessor 376 may first determine, at startup of the information handling system, which removable tactile input layer 362-1 is installed. In this embodiment, one or more conductive material piece 371 may influence the cumulative capacitance of the first removable tactile input layer 362-1. In other embodiments, the first removable tactile input layer 362-1 may have an inherent cumulative capacitance level even without the conductive material pieces 371 that is distinct from other removable tactile input layers and a difference among them determined from execution of the dynamic key mapping engine 380. In the latter embodiment, the capacitive sensor microprocessor 376 may execute machine readable code instructions of a dynamic key mapping engine 380 may increase the sensitivity of the capacitive pad sensors 398 within the capacitive pads layer 374 to detect such cumulative capacitance differences, for example, by increasing voltage provided to the capacitive pad sensors 398 within the capacitive pads layer 374 to detect slimmer differences among cumulative capacitances.

In an alternative embodiment, at startup of the information handling system, the capacitive sensor microprocessor 376 may address each of the capacitive pad sensors 398 of the capacitive pads layer 374 to determine where any of the conductive material pieces 371 of a set of conductive material are located throughout the first removable tactile input layer 362-1 across the capacitive pads layer, for example. In this example embodiment, the increase in detected capacitance at specific locations or at specific first keyboard key 364-1 of the first removable tactile input layer 362-1 due to the presence of the conductive material piece 371 may inform the capacitive sensor microprocessor 376 executing machine readable code instructions of the dynamic key mapping engine 380 which of the plurality of removable tactile input layers is currently installed. Having identified the location of the individual sections or conductive material pieces 371 of the conductive material of the first set of conductive material, this location data may also be referenced by the capacitive sensor microprocessor 376 executing machine readable code instructions of the dynamic key mapping engine 380 from the tactile input layer capacitance look-up table 386 in order to cross-reference which the plurality of removable tactile input layers (e.g., first removable tactile input layer 362-1) is currently installed on the base portion of the information handling system. In an embodiment, the conductive material pieces 371 of the sets of conductive material may be placed anywhere within the first removable tactile input layer 362-1 including peripheral locations around the keyboard keys 364-1, 364-2 or other I/O devices. This is shown and described further below. In an specific example embodiment, the conductive material pieces 371 may be placed under one or more of the keyboard keys 364-1 within the first removable tactile input layer 362-1 such that their specific arrangement at these keyboard keys 364-1 may inform the capacitive sensor microprocessor 376, via detected increases in capacitance, which of the plurality of removable tactile input layers is currently installed on the sealed input surface 372.

It is appreciated that the conductive material pieces 371 of the sets of conductive material may be made of any conductive material such as copper or aluminum plate, plating, two-shot conductive plastic, foil, or keycaps. In embodiments herein, the conductive material pieces 371 of the sets of conductive material may be made of any type of metal plate, plating, foil or keycaps, carbon deposition, or other material with enough conductivity to adjust detectable capacitance. In some embodiments, the variation in the type of conductive material used for the conductive material pieces 371 of the sets of conductive material may vary such that this specific variance in detected capacitance by the one or more capacitive pad sensors 398 may further be used by the capacitive sensor microprocessor 376 executing machine readable code instructions of the dynamic key mapping engine 380 to identify the specific installed removable tactile input layer via the tactile input layer capacitance look-up table 386. Thus, it is appreciated that not all of the keyboard keys 364-1, 364-2 may include a conductive material piece 371 formed thereunder as shown in FIG. 3 such that a plurality of removable tactile input layers may be identified. In an embodiment, the tactile input layer capacitance look-up table 386 may be updated via a wired or wireless connection between the information handling system and a wireless network that maintains a listing of capacitance levels associated with a plurality of removable tactile input layers that have been manufactured.

The capacitive pads layer 374 may be part of the flexible PCB 384 that also includes the active shielding layer 382 and the grounding layer 384. The active shielding layer 382 may include a plurality of shielding pads 399 that are formed vertically below each of the capacitive pad sensors 398 within the active shielding layer 382 and between the capacitive pad sensors 398 and a grounding layer 384. Each of the shielding pads 399 of the active shielding layer 382 may shield the plurality of capacitive sensors within the capacitive pads layer 374 from parasitic grounding by the nearby grounding layer 384 formed at the bottom of the flexible PCB 384. In an embodiment, the active shielding layer 382 acts to prevent electric fields at the capacitive sensor pads from directly being parasitically directed to ground from nearby grounding sources such as a grounding layer 384. As described herein, the active shielding layer 382, with active shielding pads 399 at a voltage potential similar to the capacitive sensor pads 398 forces electric fields to go around the shielding pads 399 of the active shielding layer 382 in order to reach ground source such as grounding layer 384. If the active shielding layer 382 was not present, the sensing range of the capacitive sensor pads of the capacitive pads layer 374 will be reduced as the electric fields will be directed to ground of the nearby grounding layer 384. In an embodiment, the shielding pads 399 of the active shielding layer 382 may be raised to the same voltage potential as the capacitive sensor pads 398. With the capacitive sensor pads 398 and shielding pads 399 having the same voltage potential supplied by the voltage source and controlled by the capacitive sensing microprocessor, this thereby prevents parasitic capacitance grounding of the electric field from forming between the capacitive pads layer and the grounding layer 384. The grounding layer 384 may act as a controlled return path for noise and external EMI that would otherwise disrupt the operation of internal hardware components of the information handling system. The grounding layer 384 provides EMI and grounding for the electronics of the keyboard hardware sensing structure 365 as well as shielding external devices, even the capacitive pad sensors 398, from the hardware components in the information handling system hardware cavity 382 of the base chassis such as those operating on the information handling system hardware mainboard 395 and described in further detail above with reference to FIG. 1.

In an embodiment, the shielding pads 399 of the active shielding layer 382 may be active shielding pads 399. These active shielding pads 399 may be driven using the same or similar voltage as the plurality of capacitive pad sensors 398 within the capacitive pads layer 374 and may also, each, be operatively coupled to the capacitive sensor driver 368 and a power source such as located in the information handling system hardware cavity 382. This reduces parasitic capacitance between the plurality of capacitive pad sensors 398 of the capacitive pads layer 374 and the grounding layer 384 placed below the active shielding layer 382 such that the capacitive field of the capacitive pad sensors 398 is not as readily grounded reducing range and sensitivity. These active shielding pads 399 of the active shielding layer 382 improve signal-to-noise ratio and extend the sensing range of the plurality of capacitive sensors of the capacitive pads layer 374. Indeed, in an embodiment, the active shielding pads 399 allow a user to provide input such as gesture input which may have a low level of change in detected capacitance even when the user is not in physical contact with any of the keyboard keys 364-1, 364-2 of the first removable tactile input layer 362-1 above the capacitive pad sensors 398 of the capacitive pads layer 374. This is because the capacitive sense capabilities of the capacitive pad sensors 398 is extended a distance above the surface of the removable tactile input layer 362 due to the inclusion of the shielding pads 399 of the active shielding layer 382.

As described, the grounding layer 384 may be formed directly below the active shielding layer 382 and forms a bottom-most layer of the keyboard sensing hardware structure 393 below the sealed input surface 372. The inclusion of the grounding layer 384 provides for EMI compliance of the information handling system with the sealed input surface 372 with the keyboard sensing structure 393 for protection of internal hardware components from outside EMI and vice versa. In an embodiment, the grounding layer 384 may be provide a stable electrical reference from the active circuitry that helps to define signal baseline at the plurality of capacitive pad sensors 398. Still further, the grounding layer 384 may prevent exterior EMI from incoming radio frequency radiation from interfering with these internal hardware components of the information handling system.

It is appreciated that the keyboard sensing hardware structure 393 may form an upper portion of the base chassis of the information handling system just under the sealed input surface 372 that may form a top surface for the housing of the base chassis of the information handling system. However, the base chassis portion of the information handling system also includes the information handling system hardware cavity 397. The information handling system hardware cavity 397 may be present to provide space that other hardware component devices such as the hardware processor (e.g., FIG. 1, 102), memory devices, PMU, radiofrequency adapters, or wired ports to name a few of those hardware component devices that may be formed into the information handling system hardware cavity 397. As shown in FIG. 3, for example, the information handling system hardware cavity 397 may house an information handling system hardware mainboard 395 which may include a PCB that houses the hardware processor, other processing devices (e.g., FIG. 1, 102, 104, 106, 108, 110), the PMU, the wireless interface adapter, the radio, the RF front end, and the antenna among other hardware components. Thus, the grounding layer 384 may prevent any EMI and noise from affecting the operation of the capacitive pads layer 374 as described herein.

Figure 4A:
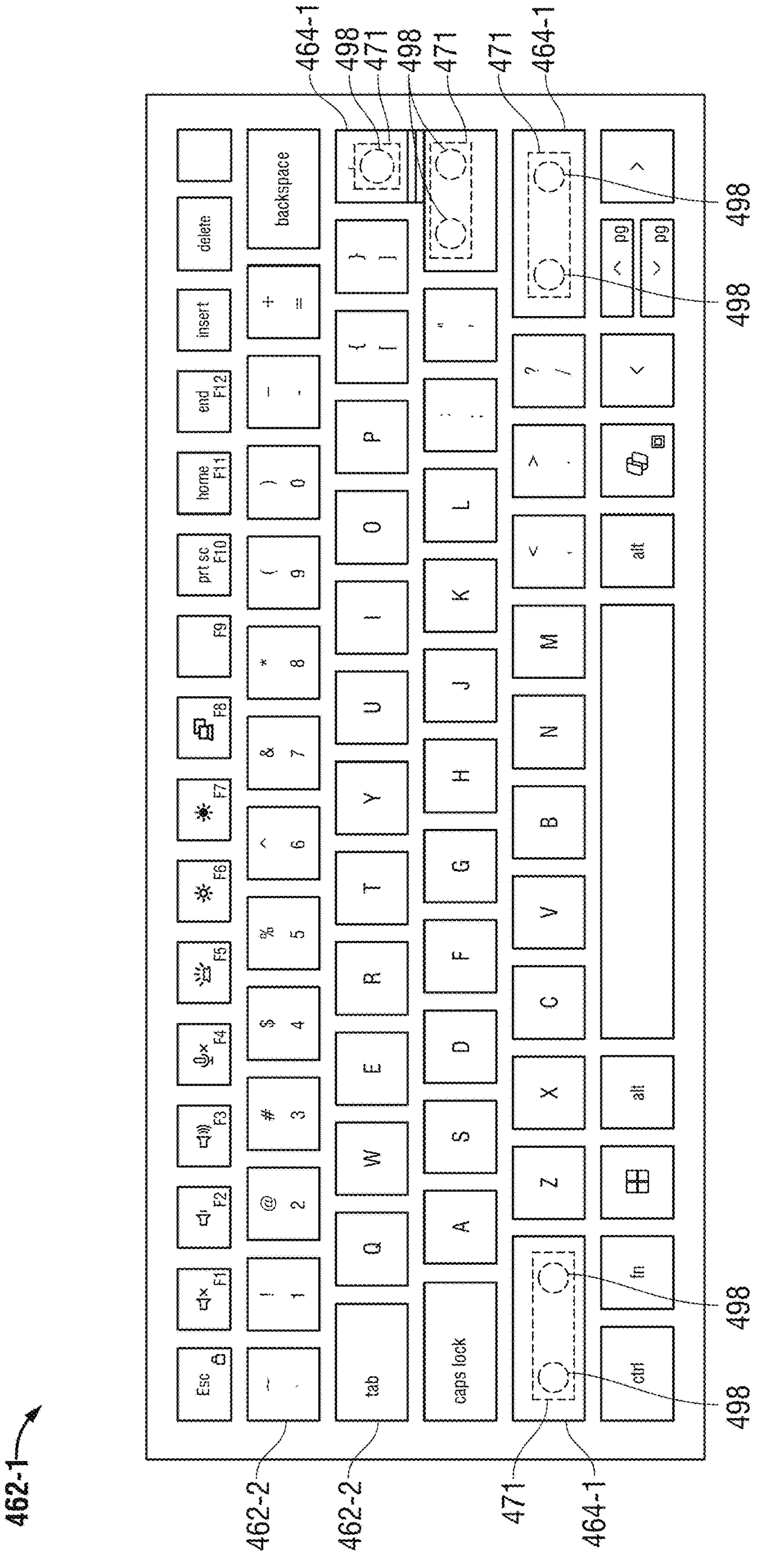
FIG. 4A is a graphic view top diagram illustrating a first removable tactile input layer that includes a plurality of capacitive pad sensors and conductive material associated with a plurality of keyboard keys in a first keyboard layout according to an embodiment of the present disclosure.
Figure 4B:
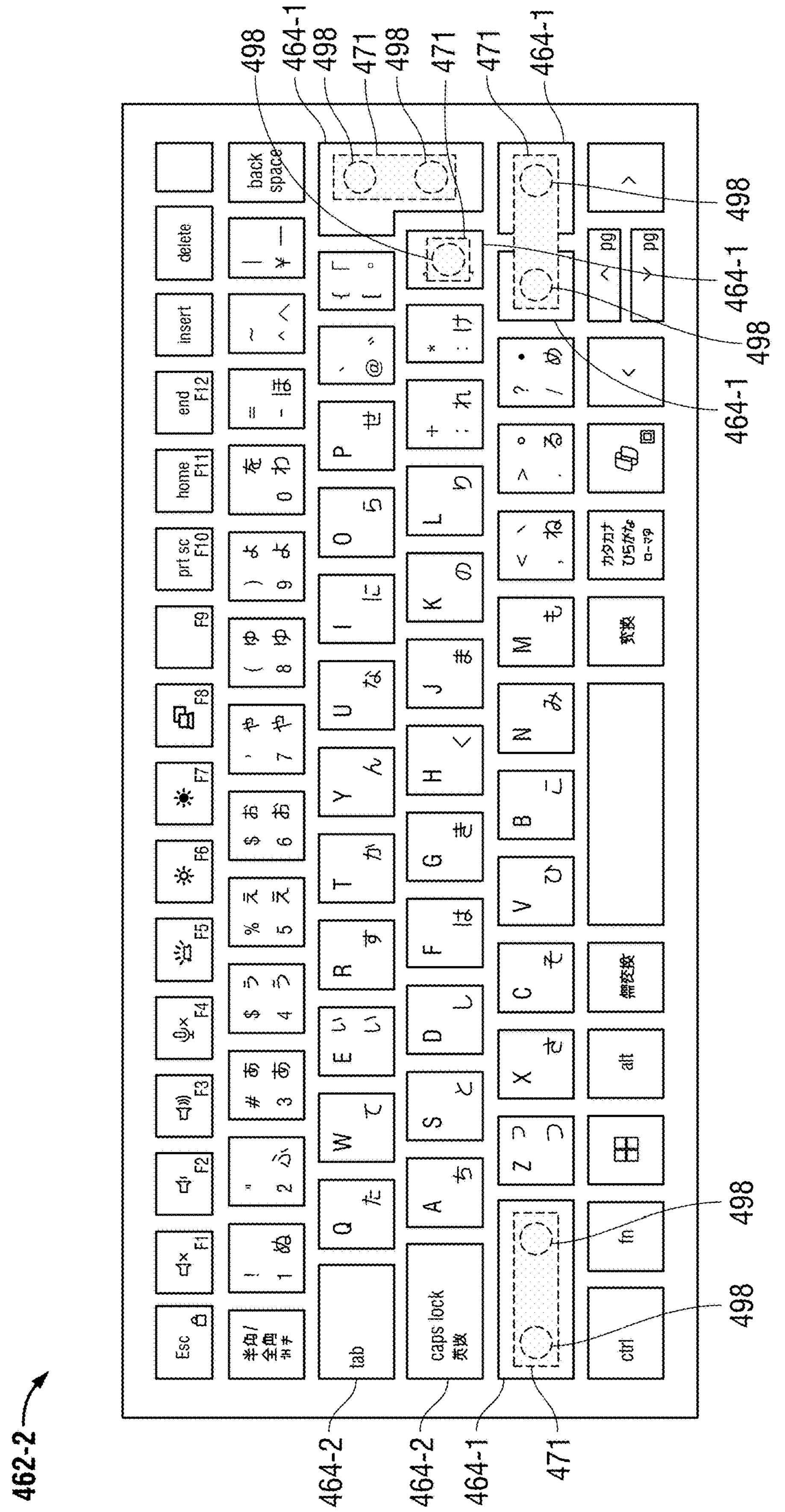
FIG. 4B is a graphic view top diagram illustrating a second removable tactile input layer that includes a plurality of capacitive pad sensors and conductive material associated with a plurality of keyboard keys in a second keyboard layout according to another embodiment of the present disclosure.
Figure 4C:
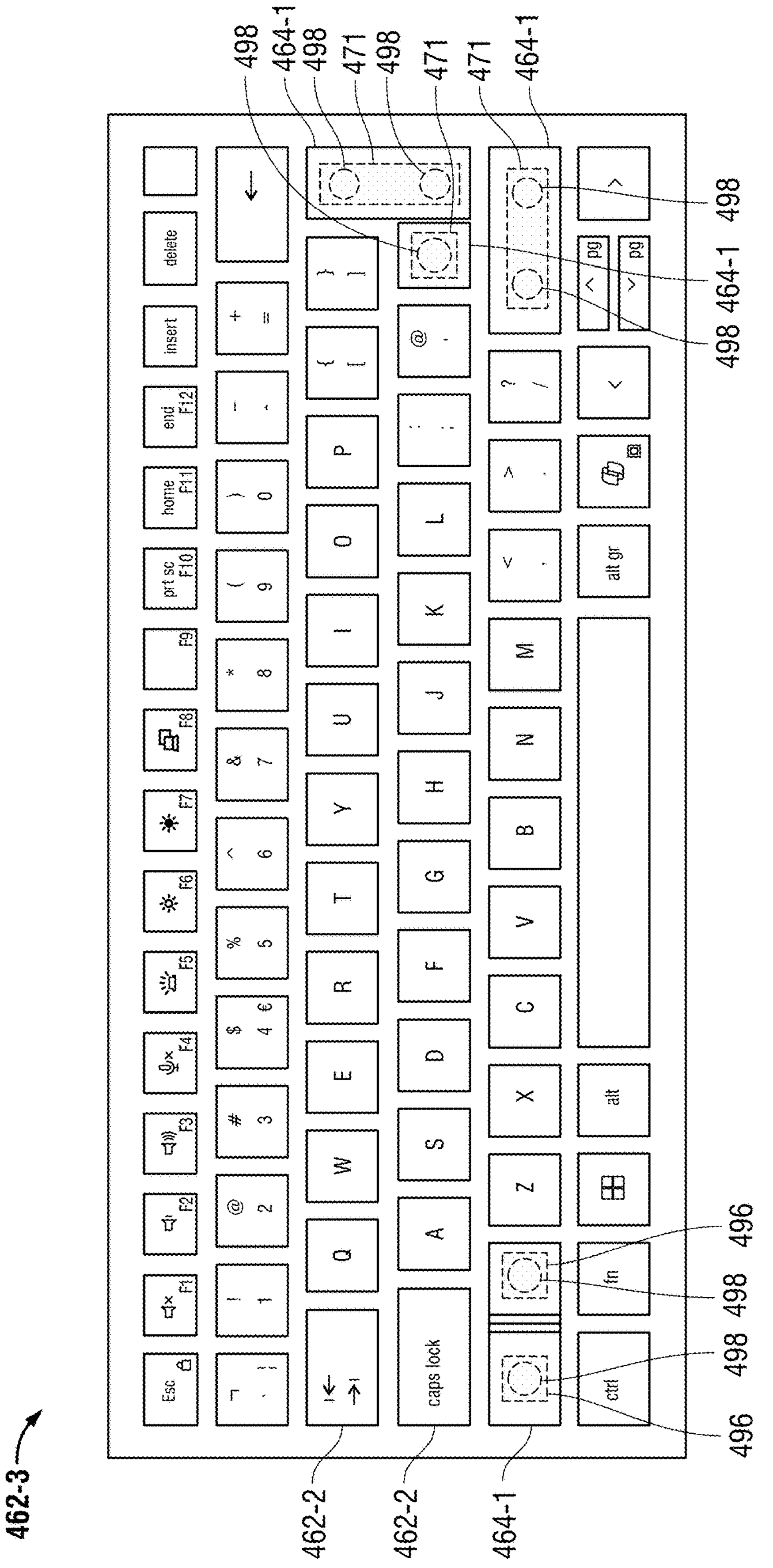
FIG. 4C is a graphic view top diagram illustrating a third removable tactile input layer that includes a plurality of capacitive pad sensors and conductive material associated with a plurality of keyboard keys in a third keyboard layout according to another embodiment of the present disclosure.
Figure 4D:
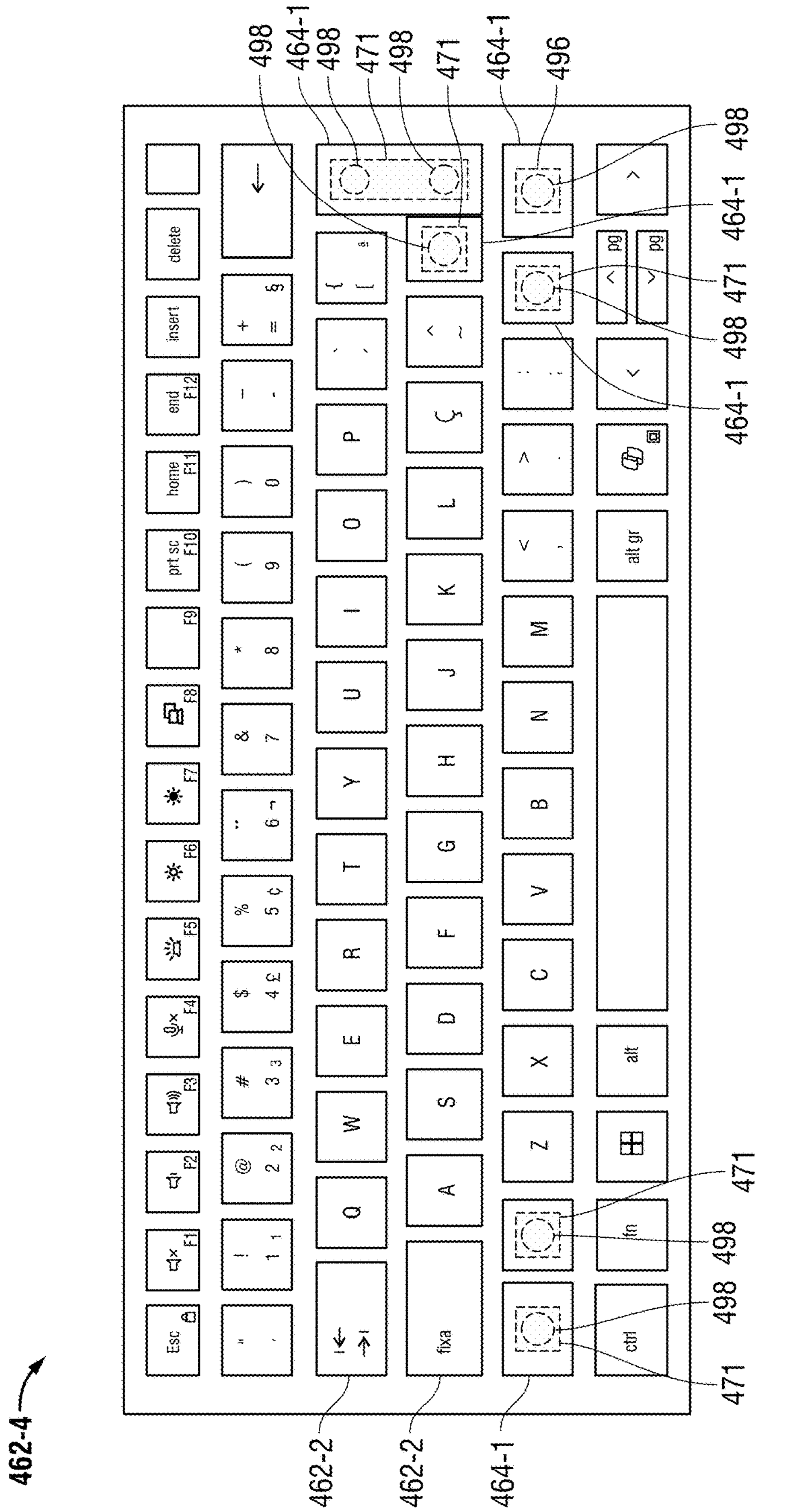
FIG. 4D is a graphic view top diagram illustrating a fourth removable tactile input layer that includes a plurality of capacitive pad sensors and conductive material associated with a plurality of keyboard keys in a fourth keyboard layout according to yet another embodiment of the present disclosure.

FIGS. 4A through 4D each show a graphic top view diagram of a removable tactile input layer that may be operatively coupled to a sealed input surface as described according to embodiments herein. For example, FIG. 4A is a graphic view top diagram illustrating a first removable tactile input layer 462-1 of a first keyboard type or layout that depicts the location of a plurality of capacitive pad sensors 498 and illustrates conductive material pieces 471 associated with a plurality of keyboard keys 464-1 according to an embodiment of the present disclosure. Additionally, FIG. 4B is a graphic view top diagram illustrating a second removable tactile input layer 462-2 of a second keyboard type or layout that depicts location of a plurality of capacitive pad sensors 498 and includes conductive material pieces 471 associated with a plurality of keyboard keys 464-1 according to another embodiment of the present disclosure. FIG. 4C is a graphic view top diagram illustrating a third removable tactile input layer 462-3 of a third keyboard type or layout that depicts location of a plurality of capacitive pad sensors 498 and includes conductive material pieces 471 associated with a plurality of keyboard keys 464-1 according to another embodiment of the present disclosure. Still further, FIG. 4D is a graphic view top diagram illustrating a fourth removable tactile input layer 462-4 of a fourth keyboard type or layout that depicts a plurality of capacitive pad sensors 498 and includes conductive material pieces 471 associated with a plurality of keyboard keys 464-1 according to yet another embodiment of the present disclosure.

It is appreciated that the conductive material pieces 471 are associated with some of the keyboard keys 464-1 of each of the removable tactile input layers 462-1, 462-2, 462-3, 462-4 while other of the other keyboard keys 464-2 do not include conductive material pieces 471. Again, the layout and inclusion of these conductive material pieces 471 may provide for capacitive encoding to allow a capacitive sensor microprocessor executing machine readable code instructions of a dynamic key mapping engine to determine which of the removable tactile input layers 462-1, 462-2, 462-3, 462-4 is installed onto the sealed input surface as described herein. It is also appreciated that each of the keyboard keys 464-1, 464-2 may be associated with a capacitive pad sensor at location 498 underneath the sealed input surface to detect capacitance level to detect whether or not the keyboard keys 464-1, 464-2 includes a conductive material piece 471 or not. However, FIGS. 4A through 4D show only locations of those capacitive pad sensors 498 underneath the sealed input surface associated with those keyboard keys 464-1 that include the conductive material pieces 471 described herein.

As shown in FIG. 4A, the first removable tactile input layer 462-1 includes four conductive material pieces 471 placed under a keycap of four individual keyboard keys 464-1 to form capacitive encoding for the first removable tactile input layer 462-1 in an embodiment. As can be seen in FIG. 4B, the layout, orientation, or number of the conductive material pieces 471 placed under a keycaps of the individual keyboard keys 464-1 may be different from that in FIG. 4A to yield a different capacitive encoding for second removable tactile input layer 462-2 in another embodiment. Similarly in FIG. 4C, the layout, orientation, or number of the conductive material pieces 471 placed under a keycaps of the individual keyboard keys 464-1 may be yet again different to yield another different capacitive encoding for second removable tactile input layer 462-3 in another embodiment. Additionally, in FIG. 4D, the layout, orientation, or number of the conductive material pieces 471 placed under a keycaps of the individual keyboard keys 464-1 may be yet again different to yield yet another different capacitive encoding for second removable tactile input layer 462-1 according to an embodiment.

The conductive material pieces 471 are used by a capacitive sensor microprocessor to determine which of the first removable tactile input layer 462-1, second removable tactile input layer 462-2, third removable tactile input layer 462-3, and fourth removable tactile input layer 462-4 (among other removable tactile input layers) is installed onto the sealed input surface. Again, the four conductive material pieces 471 formed within the first removable tactile input layer 462-1 may be unique to the first removable tactile input layer 462-1 such that detection of a capacitance that is influenced by the inclusion of the conductive material pieces 471 within the first removable tactile input layer 462-1 may be referenced in a tactile input layer capacitance look-up table accessed by the capacitive sensor microprocessor.

In another example embodiment, during the startup of the information handling system, the capacitive sensor microprocessor may determine a cumulative capacitance detected at all of the capacitive pad sensors (e.g., 498) within the capacitive pads layer underneath the sealed input surface. The differences in key layouts of the various removable tactile input layer 462-1, 462-2, 462-3, 462-4, such as shown in FIGS. 4A-4D, may yield differences in cumulative capacitance values. When reading this cumulative capacitance value, the detected cumulative capacitance may be unique to the first removable tactile input layer 462-1 and may be determined by the capacitive sensor microprocessor. This cumulative capacitance value is used by the capacitive sensor microprocessor executing machine readable code instructions of the dynamic key mapping engine while accessing a tactile input layer capacitance look-up table. This tactile input layer capacitance look-up table may include anticipated cumulative capacitance values or levels that can be matched with a specific type of removable tactile input layer 462-1, 462-2, 462-3, 462-4 from any of FIGS. 4A through 4D. In this way, the capacitive sensor microprocessor may first determine, at startup of the information handling system, that the first removable tactile input layer 462-1 is installed based on the detected cumulative capacitance across the capacitive pad sensors in an example embodiment as compared to other removable tactile input layers 462-2, 462-3, or 463-4.

Alternatively, at startup of the information handling system, the capacitive sensor microprocessor may address each of the capacitive pad sensors 498 of the capacitive pads layer to determine where any of the conductive material pieces 471 of a set of conductive material are located throughout the first removable tactile input layer 462-1. In this example embodiment, the increase in detected capacitance at specific locations or at specific keyboard keys 464-1 of the first removable tactile input layer 462-1 due to the presence of the conductive material pieces 471 may inform the capacitive sensor microprocessor executing machine readable code instructions of the dynamic key mapping engine that the first removable tactile input layer 462-1 is currently installed. Having identified the location of the individual conductive material pieces 471, the capacitive sensor microprocessor executing machine readable code instructions of the dynamic key mapping engine may determine from this capacitive pad sensor location data and the tactile input layer capacitance look-up table in order to cross-reference which the plurality of removable tactile input layers 462-1, 462-2, 462-3, 462-4 is currently installed on the base portion of the information handling system. In an embodiment, the conductive material pieces 471 of may be placed anywhere within the plurality of removable tactile input layers 462-1, 462-2, 462-3, 462-4 under keycaps as shown in FIGS. 4A to 4D including at peripheral locations around the keyboard keys 464-1, 464-2 or other I/O devices (not shown). In a specific example embodiment, the conductive material pieces 471 may be placed under one or more of the keyboard keys 464-1 within the plurality of removable tactile input layers 462-1, 462-2, 462-3, 462-4 such that their specific arrangement at these keyboard keys 464-1 may inform the capacitive sensor microprocessor, via detected increases in capacitance at corresponding capacitive pad sensors, which of the plurality of removable tactile input layers 462-1, 462-2, 462-3, 462-4 is currently installed on the sealed input surface. It is appreciated that the conductive material pieces 471 may be made of any conductive material such as copper plating or any other type of metal plating, carbon, and the like. In some embodiments, the variation in the type of conductive material used for the conductive material pieces 471 may vary such that this specific variance in detected capacitance by the one or more capacitive pad sensors 498 may further be used by the capacitive sensor microprocessor to identify the specific installed removable tactile input layers 462-1, 462-2, 462-3, 462-4 via the tactile input layer capacitance look-up table.

Turning to FIG. 4B, the second removable tactile input layer 462-2 also includes four conductive material pieces 471 with shown differences in the placement location of the conductive material pieces 471 as well as the number of keyboard keys 464-1 used in an embodiment. As shown, the first removable tactile input layer 462-1 may include a single conductive material piece 471 that extends between two different keyboard keys 464-1 and used to detect a single conductive material piece 471 by the capacitive pad sensors thereunder. Other conductive material pieces 471 may correspond to capacitive pad sensors of single keys 464-1. Thus, in this example embodiment, the capacitive pad sensors 498 may be used to detect a capacitance at multiple capacitive pad sensors at locations 498 associated with an arrangement of various keyboard keys 464-1 in order to determine which of the plurality of removable tactile input layers 462-1, 462-2, 462-3, 462-4 is installed on the sealed input surface. Again, the detected capacitance value, either cumulative or on a key-to-key basis, may be used by the capacitive sensor microprocessor executing machine readable code instructions to determine that removable tactile input layer 462-2 among the plurality of removable tactile input layers 462-1, 462-2, 462-3, 462-4 is installed in embodiments herein. Having detected the capacitance value, the capacitive sensor microprocessor may execute machine readable code instructions of a dynamic key mapping engine to access the tactile input layer capacitance look-up table to cross-reference the capacitance value or values with one of the plurality of removable tactile input layers 462-1, 462-2, 462-3, 462-4 to make such a determination.

As shown in FIG. 4B, the second removable tactile input layer 462-2 has a different key arrangement and input scheme. In the case of the second removable tactile input layer 462-2, the user has the ability to input Japanese characters that may include hiragana, katakana, and kanji. In this case, a person fluent in Japanese may swap out the first removable tactile input layer 462-1 shown in FIG. 4A with this second removable tactile input layer 462-2. As such, the user may access the reciprocal removable tactile input layer coupling system structures (e.g., FIG. 2, 291*a* and 291*b*), undo the reciprocal removable tactile input layer coupling system structures, remove the first removable tactile input layer 462-1, place the second removable tactile input layer 462-2 on top of the sealed input surface, and couple the second removable tactile input layer 462-2 to the base of the information handling system by using the reciprocal removable tactile input layer coupling system structures as described herein. This allows for a quick and easy method of altering the input characteristics of the keyboard thereby expanding the capabilities of the information handling system. It is appreciated that the capacitive sensor microprocessor may execute the computer readable code instructions of the dynamic key mapping engine described herein in order to identify that the removable tactile input layer 462-2 from among the removable tactile input layers 462-1, 462-2, 462-3, 462-4 is currently installed. This process may be initiated at startup of the information handling system or may be initiated by the user accessing an input device interface at the information handling system and instructing the information handling system to initiate the scan of the conductive material pieces 471. In yet another embodiment, the capacitive sensor microprocessor may periodically check (e.g., every 15 minutes) the capacitive pad sensors to determine the capacitive value of the installed removable tactile input layers 462-1, 462-2, 462-3, 462-4 based on the included conductive material pieces 471.

Turning to FIG. 4C, a third removable tactile input layer 462-3 is shown as yet another example of a removable tactile input layers 462-1, 462-2, 462-3, 462-4 that may be installed on top of the sealed input surface. In this example embodiment, both the layout of the conductive material pieces 471 and the number of conductive material pieces 471 are different from those shown in FIGS. 4A, 4B, and 4D. As described herein, this unique layout and number of conductive material pieces 471 may be used by the capacitive sensor microprocessor executing machine readable code instructions of the dynamic key mapping engine and capacitive pad sensors, such as at locations 498, to identify that the third removable tactile input layer 462-3 is installed on the sealed input surface. It is appreciated that in any of the example embodiments shown in FIGS. 4A through 4D, more or fewer of the conductive material pieces 471 may be included within the respective removable tactile input layers 462-1, 462-2, 462-3, 462-4 and the number and layout of the conductive material pieces 471 are merely example embodiments. Thus, the present specification contemplates that the placement and number of conductive material pieces 471 may vary so that the capacitive sensor microprocessor, via the capacitive pad sensors, may detect a unique capacitance value or set of values in order to compare that capacitance value to capacitance values on the tactile input layer capacitance look-up table so that a removable tactile input layers 462-1, 462-2, 462-3, 462-4 may be identified.

FIG. 4D further shows another example embodiment of a fourth removable tactile input layer 462-4. In this example, the fourth removable tactile input layer 462-4 includes six individual conductive material pieces 471 that, again, is used to identify that the specific fourth removable tactile input layer 462-4 is installed on the sealed input surface. As in other examples in FIGS. 4A through 4D, FIG. 4D includes a single conductive material piece 471 that is detectable by two different capacitive pad sensors 498. This arrangement of multiple capacitive pad sensors 498 to a single conductive material pieces 471 may also be used to further identify which of the plurality of removable tactile input layers 462-1, 462-2, 462-3, 462-4 is currently installed on the sealed input surface. Indeed, the same capacitive values at a multiple capacitive pad sensors 498 may further help to identify the removable tactile input layers 462-1, 462-2, 462-3, 462-4 in those examples where the capacitive sensor microprocessor addresses each capacitive pad sensor at locations 498 individually in order to determine the location of the individual conductive material pieces 471.

Figure 5:
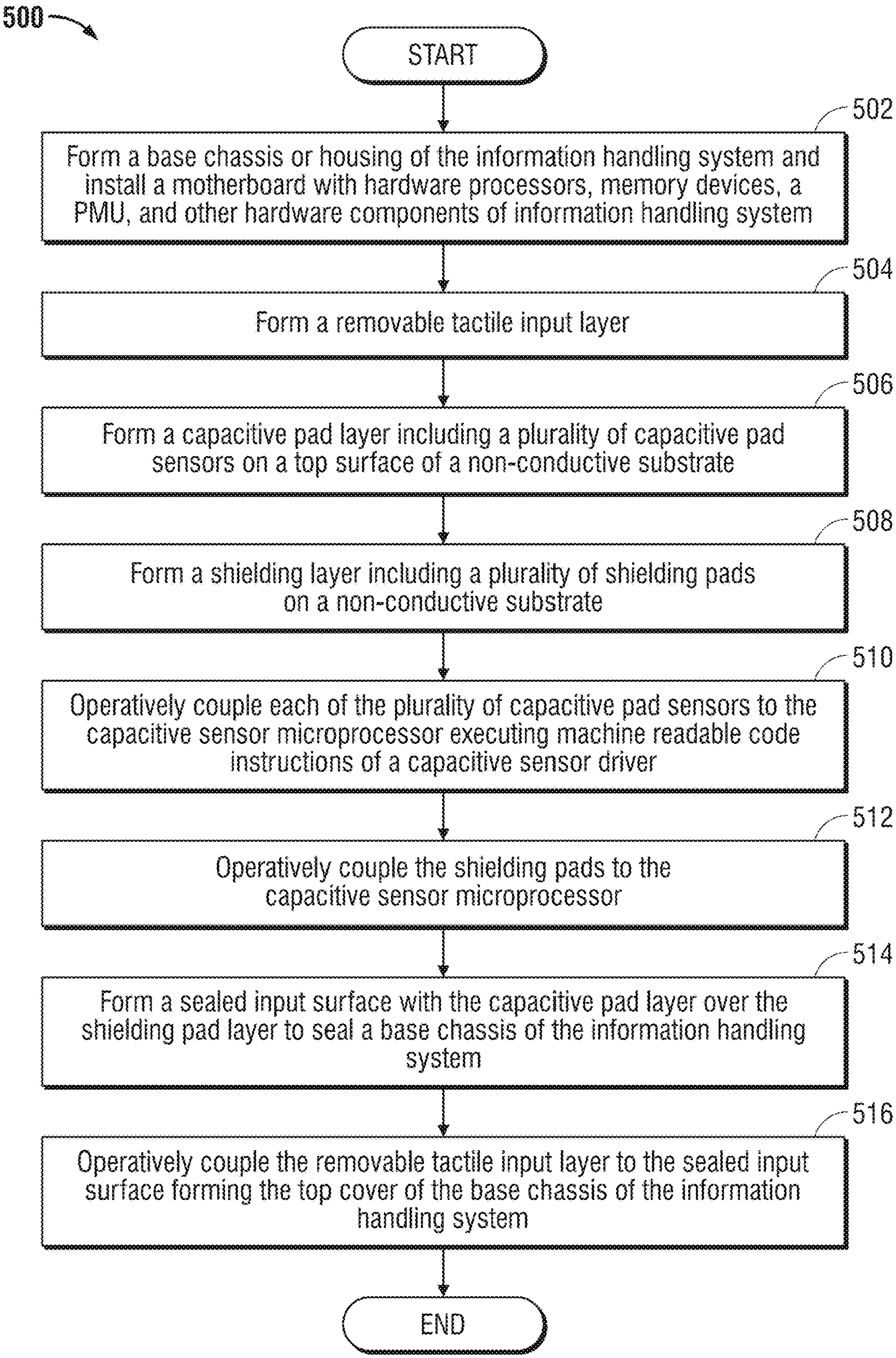
FIG. 5 is a flow diagram showing a method of manufacturing a split keyboard stack structure for an information handling system that includes selection of removable tactile input layers and a separate sealed input surface including a keyboard sensing hardware structure formed under the sealed input surface to receive keyboard, touch and gesture input contactlessly at capacitive pad sensors from a user and capacitive encoding to detect the installed removable tactile input layer according to an embodiment of the present disclosure.

FIG. 5 is a flow diagram showing a method 500 of manufacturing a split keyboard structure for an information handling system that includes a removable tactile input layer and a separate a keyboard sensing hardware structure including a plurality of capacitive pad sensors in a capacitive pads layer with a grounding layer and an active shielding layer formed under a sealed input surface of the keyboard sensing hardware structure to receive keyboard input, touch input or gesture input contactlessly at capacitive pad sensors according to an embodiment of the present disclosure. The method 500 may include similar process that form any of those keyboard stacks described in connection with, for example, FIGS. 1 and 5 that each include a bifurcated keyboard stack that comprises replaceable removable tactile input layers and a keyboard sensing hardware structure sealed under a sealed input surface of a base chassis with a capacitive pad layer in various configurations.

At block 502, the method 500 may include forming a base chassis or housing of the information handling system such as a tray or other structure and installing a motherboard with hardware processors, memory devices, a PMU, and other hardware components of the information handling system described herein. As described herein, the information handling system may be a laptop-type information handling system that includes a base chassis portion operatively coupled to a display chassis portion via a hinge. In an embodiment, the other hardware devices may also include fans, port systems, and a battery that may be sized to fit within this base chassis portion with the motherboard. In some embodiments, this step of including information handling system hardware components in the base chassis may occur after formation of the keyboard sensing hardware structure layers under the sealed input surface of the keyboard chassis.

At block 504, the method 500 includes forming a removable tactile input layer. As described herein, the removable tactile input layer may include a keyboard-type removeable tactile input layer, a drawing pad-type removable tactile input layer, a control board-type removable tactile input layer or any other keyboard key layout such as those described in connection with, for example, FIGS. 2A through 4D. The removable tactile input layer may be that layer that a user interacts with to provide input to the information handling system. This removable tactile input layer may include only mechanical elements such as mechanical keys (key caps, key posts, popples, scissor structures and the like) that provide tactile response to the user when the mechanical keys are pressed according to embodiments herein. In other embodiments, other I/O surface input interface surfaces such as dials and sliders or control board input structures, such that tactile response to the user is available when dials are turned, surfaces are touched, and sliders are moved. As described herein, the removable tactile input layer does not include any electrical elements that are used to receive electrical signals or switch mechanical switches as the user presses the keys, or otherwise interfaces with these other types of input devices. Therefore, in the embodiments herein, the removable tactile input layer does not include a PCB layer, a flexible PCB layer, or other electrical components that other I/O surface input interface surfaces of the removable tactile input layers that may be used to detect user actuation. Instead, in the embodiments herein, the keyboard input layers and other I/O surface input interface surfaces of the removable tactile input layers are operatively coupled to a sealed input surface having a keyboard sensing hardware structure formed underneath to detect strokes of the keys for various type of keyboards that may be installed or for touch and gesture inputs on or above the removable tactile input layers. In an embodiment, a frame of the one or more removable tactile input layers is formed to include magnets, press fit, or interference fit edge structures, latch or fastener structures, as well as tabs, recessed tabs, notches or other structures for coupling and decoupling the removable tactile input layers with the sealed input surface of the keyboard chassis in various embodiments herein.

Further, according to embodiments herein, each of the plurality of removable tactile input layers may include a set of conductive material including conductive material pieces that for capacitive encoding that is detectable by one or more of the capacitive pad sensors of the capacitive pads layer of the keyboard sensing hardware structure. In an embodiment, a first set of conductive material comprising conductive material pieces may be formed within each type of removable tactile input layer may be unique to the first removable tactile input layer such that detection of a capacitance, either cumulative capacitance or capacitance at various locations, forms a capacitive encoding particular to each type of removable tactile input layer. Either the cumulative capacitance or capacitance at various locations is influenced by the inclusion of the conductive material pieces within each removable tactile input layer as capacitive encoding for particular removable tactile input layers, such as by virtue of the overall capacitance of each different key layout or based on location under particular keys. The capacitive encoding for each of the removable tactile input layers may be referenced in a tactile input layer capacitance look-up table accessed by the capacitive sensor microprocessor. For example, during startup of the information handling system, the capacitive sensor microprocessor may determine a cumulative capacitance of an entire removable tactile input layer installed as detected from all of the capacitive pad sensors within the capacitive pads layer as described herein. When reading this cumulative capacitance value, the detected capacitance value may be unique to one particular removable tactile input layer and may be determined by the capacitive sensor microprocessor accessing a tactile input layer capacitance look-up table. This tactile input layer capacitance look-up table may include anticipated cumulative capacitance levels that can be matched with a specific type of removable tactile input layer. In this way, the capacitive sensor microprocessor may first determine which removable tactile input layer is installed. In one embodiment, the cumulative capacitance value for a removable tactile input layer may be adjusted according to added number and location of conductive material pieces. Thus, the number and location of the conductive material pieces formed within any of the plurality of removable tactile input layers may yield a unique cumulative capacitance value to the individual plurality of removable tactile input layers such that they may readily identifiable when installed.

In an alternative embodiment, the capacitive sensor microprocessor may address each of the capacitive pad sensors of the capacitive pads layer to determine where any of the conductive material pieces of the set of conductive material are located throughout the installed removable tactile input layer. In this example embodiment, the increase in detected capacitance at specific locations or at specific keyboard keys of the installed removable tactile input layer due to the presence of the conductive material piece may inform the capacitive sensor microprocessor of which of the plurality of removable tactile input layers is currently installed. Thus, the formation of the removable tactile input layer with particular keys having conductive material pieces at certain key locations may form capacitive encoding for that removable tactile input layer. Having identified the location of the individual sections or conductive material pieces of the conductive material via corresponding capacitive pad sensors, this location data may also be referenced by the capacitive sensor microprocessor at the tactile input layer capacitance look-up table in order to cross-reference which the plurality of removable tactile input layers is currently installed on the base portion of the information handling system.

In an embodiment, the conductive material pieces of the sets of conductive material may be placed anywhere within the installed removable tactile input layer including peripheral locations around the keyboard keys or other I/O devices. In an specific example embodiment, the conductive material pieces may be placed under one or more of the keyboard keys within any of the plurality of removable tactile input layer such that their specific arrangement at these keyboard keys may inform the capacitive sensor microprocessor executing machine readable code instructions of a dynamic key mapping engine, via detected increases in capacitance, which of the plurality of removable tactile input layers is currently installed on the sealed input surface. It is appreciated that the conductive material pieces may be made of any conductive material such as copper or aluminum plates, plating, foil, or keycaps or the same of any other type of metal, carbon, and the like. Any material with enough conductivity for detectable levels of capacitance may be used for detection by the capacitive pad sensors formed into the capacitive pads layer formed under the sealed input surface of the keyboard chassis in various embodiments herein. In some embodiments, the variation in the type of conductive material used for the conductive material pieces of the sets of conductive material may also vary such that this specific variance in detected capacitance by the one or more capacitive pad sensors from different material types may further be used by the capacitive sensor microprocessor to identify the specific installed removable tactile input layer via the tactile input layer capacitance look-up table. Thus, it is appreciated that not all of the keyboard keys may include a conductive material piece formed thereunder such that a plurality of removable tactile input layers may be identified.

At block 506, the method 500 further includes forming a capacitive pad layer that includes a plurality of capacitive sensor pads on a non-conductive substrate such as the multi-layer flexible PCB or two sided membrane as described in connection with embodiments herein. The capacitive sensor pads may be deposited carbon formed onto the non-conductive substrate below the sealed input surface of the base chassis or onto a surface of a flexible PCB in various embodiments herein. In an embodiment, the non-conductive substrate may be secured to a bottom surface of the sealed input surface forming a top container surface of a keyboard chassis. The capacitive pad layer may include a plurality of capacitive sensor pads that can sense proximate location of the user's body or at least partially conductive structures forming a capacitance with the capacitive sensor pads including fingers at or above the removable tactile input layer for partially conductive or conductive structures of the removable tactile input layers. In an embodiment, the plurality of capacitive sensors may include patches of deposited carbon deposited on the top surface of the non-conductive substrate such as a flexible PCB or on an underside of a non-conductive sealed input surface and configured to vary an electric field in response to changes in nearby capacitance with those deposited carbon capacitance sensor pads. These carbon-based patches may be arranged in a sensor matrix of capacitive sensor pads and may be printed, sputtered, or otherwise deposited on the non-conductive substrate. Further, the arrangement of the capacitive sensor pads may be operatively coupled via conductive traces to one or more capacitive sensing microprocessors and a power source or a ground. These conductive traces may be within a flexible PCB operatively coupled under the capacitive sensor pads on the underside of the sealed input surface or may be printed, sputtered, or otherwise deposited on the non-conductive substrate of the underside of the sealed input surface.

In an embodiment, the array of deposited carbon patches may be arranged such that each key of a keyboard-type removable tactile input layer aligns vertically with at least one deposited carbon patch. In an embodiment, these deposited carbon patches may be arranged in an array that includes columns and rows of deposited carbon patches although any variety of carbon patches for capacitive sensor pads formed on the underside of the sealed input layer of the base chassis is contemplated.

At block 508, the method 500 further includes forming a shielding layer that includes a plurality of shielding pads on a non-conductive substrate placed below the capacitive pad layer. In an embodiment, the non-conductive substrate may include a second layer of multi-layer flexible PCB, or an underside of the two-sided membrane as described herein. The shielding layer may include a plurality of shielding pads that form a shielding layer and installed vertically below each of the capacitive sensor pads. Each of the shielding pads of the shielding layer may act to shield the plurality of capacitive sensors within the capacitive pad layer from parasitic capacitive grounding of the capacitive sensor pads by a grounding layer formed below the shielding pads to ground the keyboard sensing hardware structure. For example, the shielding layer may act as a controlled return path for noise and external EMI that would otherwise disrupt the operation of the plurality of capacitive sensors of the capacitive pad layer. In an embodiment, the shielding pads of the shielding layer may be active shielding pads. These active shielding pads may be driven using the same or a similar voltage as the plurality of capacitive sensor pads within the capacitive pad layer. This reduces parasitic grounding of capacitance between the plurality of capacitive sensor pads of the capacitive pad layer and the grounding layer placed below the shielding layer. These active shielding pads of the active shielding layer improves signal to noise ratio (SNR) of capacitance detection and extends the sensing range of the plurality of capacitive sensors of the capacitive pad layer for detecting capacitive changes of keypress actuations, touch inputs, or gesture inputs. Indeed, in an embodiment, the active shielding pads allow a user to provide input such as gesture input even when the user is not in physical contact with any of the keys of the capacitive sensor pads of the capacitive pad layer. This is because the capacitive sense capabilities of the capacitive sensor pads is extended a distance above the surface of the removable tactile input layer due to the inclusion of the active shielding pads of the shielding layer.

At block 510, the method includes operatively coupling the plurality of capacitive sensor pads to the capacitive sensor microprocessor executing machine readable code instructions of a capacitive sensor driver. The capacitive sensor pads are operatively coupled to the capacitive sensor microprocessor via one or more conductive traces formed on the non-conductive substrate in one embodiment. In other embodiments, conductive traces of a flexible PCB may be attached and electrically coupled to the deposited carbon patches of the capacitive sensing pads on the non-conductive substrate to electrically couple the plurality of capacitive sensor pads to the capacitive sensor microprocessor.

The capacitive pad sensor pads and shielding pads are driven at a voltage by the capacitive sensing microprocessor and a power source such that the capacitive sensor pads detect changes in capacitance at the removable tactile input layer in a gesture detection mode according to embodiments herein. The shielding pads are driven at a similar or same voltage to shield parasitic capacitance grounding of the capacitive sensing pads by the grounding layer formed below the shielding pads.

The capacitive sensor driver is also operatively coupled to a capacitive sensor microprocessor to process input the user provides at the removable tactile input layer and detected at the capacitive sensor pads. As described herein, the capacitive sensor driver may be executed by a capacitive sensor microprocessor to detect and determine which of the plurality of keys, dials, sliders, and surfaces on the removable tactile input layers have been interfaced with and detected at each of the plurality of capacitive sensors. The capacitive sensor microprocessor executing machine readable code instructions of the capacitive sensor driver may relay these inputs to the hardware processor for processing of keystrokes, touch inputs, or gestures as input to the information handling system.

In an embodiment, the capacitive sensor microprocessor may execute machine readable or computer-readable program code instructions of a dynamic key mapping engine. The dynamic key mapping engine may allow a user to switch types of removable tactile input layers such that the key layout is different. For example, a user may switch from a QWERTY-type keyboard layout of a first removable tactile input layer to other types of keyboard key layouts. Each of these different layouts may be detected using various detection devices including dedicated carbon patches, magnets, optical markers, NFC tags, RFID tags and the like that are placed on the underside of the removable tactile input layer and detectable by sensors placed below the sealed input surface. By detecting the detection devices, the capacitive sensor microprocessor, executing the dynamic key mapping engine, may know the layout of the keys of the attached removable tactile input layer and assign each of the plurality of capacitive sensors in the capacitive pad layer the appropriate input characteristics based on the detected type of keyboard layout on the installed removable tactile input layer.

At block 512, the method 500 also includes operatively coupling the shielding pads to the capacitive sensor microprocessor. As described above, the shielding pads are operatively coupled to the capacitive sensor microprocessor via conductive traces in the non-conductive substrate. The capacitive sensing microprocessor may be formed on a PCB in the information handling system hardware cavity of the base chassis of the information handling system in an embodiment and the shielding pads are formed on the non-conductive substrate and electrically coupled to the capacitive sensing microprocessor and a power source or ground.

At block 514, the method 500 may include forming the sealed input surface having the capacitive sensing pads and any conductive traces deposited on non-conductive substrate with the shielding layer and a grounding layer underneath the bottom side of the sealed input surface of the base chassis of the information handling system. This sealed input surface may be sealed to, for example, form a top surface of a base chassis housing of the information handling system such that the sealed input surface seals the remaining portions of the base housing of the information handling system and any information handing system hardware components as well as the layers of the keyboard sensing hardware structure from contaminates and liquids.

In an embodiment, the keyboard may be completed by operatively coupling the removable tactile input layer, selected from a plurality of available removable tactile input layers including various removable keyboard layouts, a removable control board input layer, or a removable drawing surface input layer to the sealed input surface forming the top cover of the base chassis of the information handling system at block 516. In an embodiment, the removable tactile input layer may be operatively coupled to the sealed input surface using press fit or interference fit structures, a latching mechanism, a fastener, a coupling device such as a magnetic coupling device or an adhesive layer. This adhesive layer may include any type of glue, tape, or other adhesive that may, at least temporarily, adhere the bottom surface of the removable tactile input layer to a top surface of the sealed input surface that includes a capacitive pad layer as a top layer. In an alternative embodiment, the removeable tactile input layer may be coupled to the sealed input surface using reciprocal press fit or interference fit structures, fasteners, a latching mechanisms, or sets of magnets on the removable tactile input layer and the sealed input surface respectively as described herein. At this point the method 500 may end with the keyboard being formed in, for example, a base portion of a laptop-type information handling system.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A split keyboard structure of an information handling system having a keyboard sensing hardware structure formed under a sealed input surface of a keyboard chassis comprising:

a hardware processor, a data storage device, and a power management unit (PMU) formed into a keyboard chassis to provide power to the hardware processor and data storage device;

the keyboard sensing hardware structure including a plurality of capacitive pad sensors in a capacitive pads layer formed under the sealed input surface as a top surface of the keyboard chassis, wherein the capacitive pads layer formed under a sealed input surface is operably coupled to a capacitive sensor microprocessor to detect capacitive changes from user interaction with one of a plurality of removable tactile input layers installed above the sealed input surface; and the capacitive sensor microprocessor to execute machine readable code instructions of a dynamic key mapping engine to detect, via the capacitive pad sensors, capacitive encoding for a first removable tactile input layer from among the plurality of removable tactile input layers that is operatively coupled on top of the sealed input surface via detection of a first set of conductive material portions formed with a plurality of keyboard keys of the first removable tactile input layer, wherein the capacitive encoding from the first set of conductive material portions formed with a plurality of keyboard keys of the first removable tactile input layer has a unique layout, number, or arrangement of sets of conductive material portions relative to other removable tactile input layers in the plurality of removable tactile input layers installable onto the sealed input layer.

2. The split keyboard structure of the information handling system of claim 1, wherein:

the sets of conductive material are formed under plural keyboard key caps of each of the plurality of removable tactile input layers;

the capacitive sensor microprocessor, via the capacitive pad sensors, measures a cumulative capacitance at each of the capacitive pad sensors; and the capacitive sensor microprocessor executes machine readable code instructions of a dynamic key mapping engine to access a tactile input layer capacitance look-up table to, with the detected cumulative capacitance, identify that the first removable tactile input layer from among the plurality of removable tactile input layers is operatively coupled to the sealed input surface.

3. The split keyboard structure of the information handling system of claim 1, wherein:

the sets of conductive material are formed under plural keyboard key caps or around the periphery of each of the plurality of removable tactile input layers;

the capacitive sensor microprocessor, via the capacitive pad sensors, measures a capacitance at each of the capacitive pad sensors to determine which keyboard keys includes the conductive material to identify locations of the first set conductive material portions for the capacitance encoding of the installed first removable tactile input layer; and the capacitive sensor microprocessor executes machine readable code instructions of a dynamic key mapping engine to access a tactile input layer capacitance look-up table to, with the detected locations of keyboard keys that include the conductive material portions, identify that the first removable tactile input layer from among the plurality of removable tactile input layers is operatively coupled to the sealed input surface.

4. The split keyboard structure of the information handling system of claim 1, wherein each of the plurality of removable tactile input layers is removably coupled to the sealed input surface via a latch structure or magnet to provide for removal of the first removable tactile input layer from the sealed input surface of the keyboard sensing hardware structure.

5. The split keyboard structure of the information handling system of claim 1, wherein the first removable tactile input layer of the plurality of removable tactile input layers includes a first set of keyboard keys with a first plurality of keys and popples forming a first type of keyboard layout that is removably coupled to the sealed input surface via an interference fit and a second removable tactile input layer of the plurality of removable tactile input layers includes a second set of keyboard keys with a second plurality of keys and popples forming a second type of keyboard layout different from the first type of keyboard layout that is removably coupled to the sealed input surface via the interference fit when the first removable tactile input layer is removed.

6. The split keyboard structure of the information handling system of claim 1 further comprising:

the capacitive sensor microprocessor executing the machine readable code instructions of the dynamic key mapping engine configured to dynamically assign keyboard functions to specific pad sensor locations based on defined keyboard layouts for the first removable tactile input layer having a first type of keyboard layout based on identification of the first removable tactile input layer with the detected capacitive encoding from the first set of conducive material portions.

7. The split keyboard structure of the information handling system of claim 1 further comprising:

the capacitive sensor microprocessor executing machine readable code instructions of a capacitive sensor driver operatively coupled to the capacitive pads layer to receive input from the plurality of capacitive pad sensors as detected changes in capacitance levels without physical contact by the user or by a key under the sealed input surface of the keyboard chassis, wherein the capacitive pad sensors are carbon-based conductive deposits.

8. The split keyboard structure of the information handling system of claim 1, wherein the plurality of removable tactile input layers each include a set of mechanical keyboard keys and each of the plurality of removable tactile input layers are removably coupled to the sealed input surface via an interference fit to provide for removal of each of the plurality of removable tactile input layers from the sealed input surface of the keyboard sensing hardware structure.

9. The split keyboard structure of the information handling system of claim 1, wherein the active shielding layer is operatively coupled to a voltage source to actively drive a plurality of shielding pads to prevent electric fields at the capacitive sensor pads from being parasitically capacitively grounded by the grounding layer and increase capacitive sensing sensitivity of the capacitive sensor pads.

10. An information handling system executing machine readable code instructions to detect user keyboard input and touch input at a split keyboard structure of the information handling system comprising:

a hardware processor, a data storage device, and a power management unit (PMU) to provide power to the hardware processor and data storage device formed into a base chassis of the information handling system;

a keyboard sensing hardware structure formed under a sealed input surface of the base chassis of the information handling system including a plurality of capacitive pad sensors in a capacitive pads layer formed under the sealed input surface, a grounding layer, and an active shielding layer between the capacitive pad sensors and the grounding layer;

the capacitive pads layer formed under a sealed input surface operably coupled to a capacitive sensor microprocessor to detect capacitive changes from user interaction with one of a plurality of removable tactile input layers installed above the sealed input surface; and the capacitive sensor microprocessor to execute machine readable code instructions of a dynamic key mapping engine to detect, via one or more of the capacitive pad sensors, which of the plurality of removable tactile input layers is operatively coupled to the sealed input surface via detection of at least one set of conductive material portions formed into the removable tactile layers, wherein the conductive material portions are formed under plural keyboard keys of each of the plurality of removable tactile input layers and wherein the capacitive sensor microprocessor, via the capacitive pad sensors, measures a capacitance at each of the capacitive pad sensors to determine a capacitance encoding to determine which of the plurality of removable tactile input layers is installed onto the sealed input surface of the base chassis.

11. The information handling system of claim 10, wherein the capacitive sensor microprocessor executes machine readable code instructions of a dynamic key mapping engine to access a tactile input layer capacitance look-up table to, with the detected cumulative capacitance across all capacitive pad sensors, identify the capacitive encoding for which of the plurality of removable tactile input layers is operatively coupled to the sealed input surface.

12. The information handling system of claim 10, wherein the capacitive sensor microprocessor executes machine readable code instructions of a dynamic key mapping engine to access a tactile input layer capacitance look-up table to, with the detected capacitance at particular capacitive pad sensors having identified locations in the capacitive pads layer, identify the capacitive encoding for which of the plurality of removable tactile input layers is operatively coupled to the sealed input surface.

13. The information handling system of claim 10, wherein each of the plurality of removable tactile input layers is removably coupled to the sealed input surface via a latch structure to provide for removal of the first removable tactile input layer from the sealed input surface of the keyboard sensing hardware structure.

14. The information handling system of claim 10, wherein a first removable tactile input layer of the plurality of removable tactile input layers including a first set of keyboard keys with a first plurality of keys and popples forming a first type of keyboard layout is removably coupled to the sealed input surface via an interference fit and a second removable tactile input layer of the plurality of removable tactile input layers including a second set of keyboard keys with a second plurality of keys and popples removably forming a second type of keyboard layout different from the first type of keyboard layout is operatively coupled to the sealed input surface via the interference fit upon removal of the first removable tactile input layer.

15. The information handling system of claim 10 further comprising:

the capacitive sensor microprocessor executing the machine readable code instructions of the dynamic key mapping engine configured to dynamically assign keyboard functions to specific pad sensor locations based on defined keyboard layouts for the removable tactile input layer identified as installed onto the sealed input surface of the base chassis from the detected capacitive encoding.

16. An information handling system including a split keyboard structure to detect user keyboard input, touch input, and touchless gesture input at the information handling system comprising:

a hardware processor, a data storage device, and a power management unit (PMU) to provide power to the hardware processor and data storage device formed into a base chassis of the information handling system;

a keyboard sensing hardware structure formed under a sealed input surface that is a top surface of the base chassis housing for the information handling system including a plurality of capacitive pad sensors in a capacitive pads layer formed under the sealed input surface, a grounding layer, and an active shielding layer between the capacitive pad sensors and the grounding layer, wherein the capacitive pads layer formed under a sealed input surface is operably coupled to a capacitive sensor microprocessor to detect capacitive changes from user interaction with one of a plurality of removable tactile input layers above the sealed input surface; and the capacitive sensor microprocessor to execute machine readable code instructions of a dynamic key mapping engine to detect, via the capacitive pad sensors, that a first removable tactile input layer among the plurality of removable tactile input layers is operatively coupled to the sealed input surface via cumulative capacitance of a first keyboard key layout of the first removable tactile input layer with the capacitive sensor microprocessor, via the capacitive pad sensors, measuring the cumulative capacitance to determine a capacitive encoding level for the first keyboard layout of a first set of keyboard keys that is unique relative to the remaining keyboard layouts of other removable tactile input layers of the plurality of tactile input layers installable onto the sealed input surface, wherein the capacitive sensor microprocessor accesses a tactile input layer capacitance look-up table to, with the cumulative capacitance of the first keyboard layout, identify that the first removable tactile input layer among the plurality of removable tactile input layers is operatively coupled to the sealed input surface.

17. The information handling system of claim 16, wherein each of the plurality of removable tactile input layers includes a unique set conductive material portions, wherein the conductive material portions are formed under one or more keyboard keys of each of the plurality of removable tactile input layers.

18. The information handling system of claim 16 further comprising:

the first removable tactile input layer of the plurality of removable tactile input layers includes the first set of keyboard keys with a first plurality of keycaps and popples forming the first keyboard layout that is removably coupled to the sealed input surface via an interference fit; and a second removable tactile input layer of the plurality of removable tactile input layers includes a second set of keyboard keys with a second plurality of keycaps and popples forming a second keyboard layout different from the first keyboard layout and having a second cumulative capacitance that is a different capacitive encoding level than the first removable tactile input layer; wherein the second removable tactile input layer is removably coupled to the sealed input surface via the interference fit when the first removable tactile input layer is removed.

19. The information handling system of claim 16 further comprising:

the capacitive sensor microprocessor executing the machine readable code instructions of the dynamic key mapping engine configured to dynamically assign keyboard functions to specific pad sensor locations based on defined keyboard layouts corresponding to the first keyboard layout for the first removable tactile input layer based on the detected capacitive encoding level for the first keyboard layout of the first removable tactile input layer.

20. The information handling system of claim 16, wherein the plurality of removable tactile input layers each include mechanical keyboard keys and each of the plurality of removable tactile input layers are removably coupled to the sealed input surface via a magnetic coupling to provide for installation and removal of each of the plurality of removable tactile input layers from the sealed input surface of the keyboard chassis with the keyboard sensing hardware structure formed thereunder.

* * * * *